United States Patent
Sakamoto

(10) Patent No.: US 10,423,700 B2
(45) Date of Patent: Sep. 24, 2019

(54) DISPLAY ASSIST APPARATUS, METHOD, AND PROGRAM

(71) Applicant: KABUSHIKI KAISHA TOSHIBA, Minato-ku, Tokyo (JP)

(72) Inventor: Akiko Sakamoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/433,720

(22) Filed: Feb. 15, 2017

(65) Prior Publication Data
US 2017/0270080 A1    Sep. 21, 2017

(30) Foreign Application Priority Data
Mar. 16, 2016    (JP) ................... 2016-052394

(51) Int. Cl.
*G06F 17/21* (2006.01)
*G06F 17/27* (2006.01)
(Continued)

(52) U.S. Cl.
CPC .......... *G06F 17/212* (2013.01); *G06F 17/211* (2013.01); *G06F 17/2755* (2013.01);
(Continued)

(58) Field of Classification Search
CPC .... G06F 17/28; G06F 17/289; G06F 17/2827; G06F 17/2872; G06F 17/2836; G06F 17/2735
See application file for complete search history.

(56) References Cited

U.S. PATENT DOCUMENTS 6,272,461 B1    8/2001    Meredith et al.
6,279,018 B1    8/2001    Kudrolli et al.
(Continued)

FOREIGN PATENT DOCUMENTS

JP    H05-151256 A    6/1993
JP    H05-176232        7/1993
(Continued)

OTHER PUBLICATIONS

Finch, et al., "An exploration of segmentation strategies in stream decoding." Proc. IWSLT. 2014.
(Continued)

*Primary Examiner* — Quoc A Tran
(74) *Attorney, Agent, or Firm* — Knobbe, Martens, Olson & Bear, LLP

(57) ABSTRACT

According to one embodiment, a display assist apparatus includes an acquisition unit, a first processor, a second processor, and a display controller. The acquisition unit acquires a character string. The first processor divides the character string into first segments each of which is a segment representing a semantic cluster and generates a plurality of divided character strings. The second processor detects, for the character string, second segments each of which is a segment larger than the each of the first segments. The display controller performs display control to make a distinction between the first segments and the second segments when displaying the plurality of divided character strings.

11 Claims, 32 Drawing Sheets

| Conversion target pattern | Conversion pattern |
|---|---|
| えー | (Blank) |
| まず/最初/に | 最初/に |
| Verb/て/おり/まし/て ≪Clause end≫ | Verb/て/い/ます ≪Sentence end≫ |
| ⋮ | ⋮ |

(51) Int. Cl.
*G06F 17/28* (2006.01)
*G10L 15/22* (2006.01)
*G06F 17/00* (2019.01)

(52) U.S. Cl.
CPC ........ *G06F 17/2785* (2013.01); *G06F 17/289* (2013.01); *G10L 15/22* (2013.01); *G06F 17/28* (2013.01); *G06F 17/2827* (2013.01); *G06F 17/2836* (2013.01); *G06F 17/2872* (2013.01)

(56) References Cited

U.S. PATENT DOCUMENTS

| | | | |
|---|---|---|---|
| 6,625,508 | B1 | 9/2003 | Watanabe |
| 6,625,608 | B1 | 9/2003 | Watanabe |
| 6,968,506 | B2 | 11/2005 | Yacavone et al. |
| 7,006,967 | B1 | 2/2006 | Kahn |
| 7,739,116 | B2 | 6/2010 | Miyamoto et al. |
| 8,090,570 | B2 | 1/2012 | Waibel et al. |
| 8,433,580 | B2 | 4/2013 | Sugiyama et al. |
| 8,918,311 | B1 | 12/2014 | Johnson et al. |
| 9,116,989 | B1 | 8/2015 | Ehlen et al. |
| 9,460,713 | B1 | 10/2016 | Moreno Mengibar et al. |
| 2002/0161579 | A1 | 10/2002 | Saindon et al. |
| 2003/0152293 | A1* | 8/2003 | Bresler ............ G06F 17/30017 382/305 |
| 2005/0080631 | A1 | 4/2005 | Abe et al. |
| 2007/0185704 | A1 | 8/2007 | Yoshimura et al. |
| 2008/0046229 | A1 | 2/2008 | Maskey et al. |
| 2008/0077390 | A1 | 3/2008 | Nagao |
| 2008/0091407 | A1 | 4/2008 | Furihata et al. |
| 2008/0300852 | A1 | 12/2008 | Johnson et al. |
| 2008/0300872 | A1 | 12/2008 | Basu et al. |
| 2009/0076793 | A1 | 3/2009 | Hoefelmeyer |
| 2010/0324894 | A1 | 12/2010 | Potkonjak |
| 2011/0202334 | A1* | 8/2011 | Abir ............... G06F 17/2809 704/4 |
| 2011/0213607 | A1 | 9/2011 | Onishi |
| 2011/0231474 | A1 | 9/2011 | Locker et al. |
| 2013/0144597 | A1 | 6/2013 | Waibel |
| 2013/0211818 | A1 | 8/2013 | Sakamoto et al. |
| 2013/0262076 | A1 | 10/2013 | Kamatani et al. |
| 2014/0095151 | A1 | 4/2014 | Sakamoto et al. |
| 2014/0201637 | A1 | 7/2014 | Na et al. |
| 2014/0244235 | A1 | 8/2014 | Michaelis |
| 2014/0297276 | A1* | 10/2014 | Tachimori ............. G06F 17/24 704/235 |
| 2015/0081271 | A1 | 3/2015 | Sumita et al. |
| 2015/0081272 | A1 | 3/2015 | Kamatani et al. |
| 2015/0154183 | A1 | 6/2015 | Kristjansson et al. |
| 2015/0271442 | A1 | 9/2015 | Cronin et al. |
| 2015/0309994 | A1* | 10/2015 | Liu ............... G06F 17/2827 704/2 |
| 2016/0078020 | A1 | 3/2016 | Sumita et al. |
| 2016/0085747 | A1 | 3/2016 | Kamatani et al. |
| 2016/0092438 | A1 | 3/2016 | Sonoo |
| 2016/0170970 | A1 | 6/2016 | Lindblom et al. |
| 2016/0275967 | A1 | 9/2016 | Sumita et al. |
| 2016/0314116 | A1 | 10/2016 | Kamatani et al. |
| 2017/0053541 | A1 | 2/2017 | Tsyrina |

FOREIGN PATENT DOCUMENTS

| | | |
|---|---|---|
| JP | H05-189480 A | 7/1993 |
| JP | H06-141240 A | 5/1994 |
| JP | H08-212228 | 8/1996 |
| JP | H08-263499 | 10/1996 |
| JP | H10-234016 | 9/1998 |
| JP | H10-247194 A | 9/1998 |
| JP | 3009642 B2 | 2/2000 |
| JP | 3059398 B2 | 7/2000 |
| JP | 2001-027995 A | 1/2001 |
| JP | 2001-075957 A | 3/2001 |
| JP | 2001-175280 | 6/2001 |
| JP | 2001-224002 A | 8/2001 |
| JP | 2002-010222 A | 1/2002 |
| JP | 2002-342311 A | 11/2002 |
| JP | 2005-064600 A | 3/2005 |
| JP | 2007-018098 A | 1/2007 |
| JP | 2007-034430 | 2/2007 |
| JP | 2008-083376 A | 4/2008 |
| JP | 2010-044171 A | 2/2010 |
| JP | 2011-182125 | 9/2011 |
| JP | 2012-181358 A | 9/2012 |
| JP | 2012-203154 | 10/2012 |
| JP | 2013-164515 A | 8/2013 |
| JP | 2013-206253 A | 10/2013 |
| JP | 2014-071769 A | 4/2014 |
| JP | 2015-060127 A | 3/2015 |
| JP | 2015-072701 A | 4/2015 |
| JP | 2015-187738 A | 10/2015 |
| JP | 2015-201215 A | 11/2015 |
| JP | 2016-057986 A | 4/2016 |
| JP | 2016-062357 A | 4/2016 |
| JP | 2016-177013 A | 10/2016 |
| JP | 2016-186646 A | 10/2016 |
| JP | 2016-206929 A | 12/2016 |

OTHER PUBLICATIONS

Kolss, et al., "Simultaneous German-English lecture translation." IWSLT. 2008.
Kolss, et al., "Stream decoding for simultaneous spoken language translation." Interspeech. 2008.
Oda, et al., "Optimizing Segmentation Strategies for Simultaneous Speech Translation." ACL (2). 2014.
Sridhar, et al., "Corpus analysis of simultaneous interpretation data for improving real time speech translation." Interspeech. 2013.
Sridhar, et al., "Segmentation Strategies for Streaming Speech Translation." HLT-NAACL. 2013.
Zheng, et al., "Implementing SRI's Pashto speech-to-speech translation system on a smart phone." Spoken Language Technology Workshop (SLT), 2010 IEEE. IEEE, 2010.

* cited by examiner

| | | 202 |
|---|---|---|
| 301 | えー/まず/最初/に | [sentence adverb] |
| 302 | 機械/翻訳/技術/に/ついて | [object] |
| 303 | ご/紹介/し/たい/と/思い/ます/けれど/も | [predicate] |
| 304 | えー/機械/翻訳/技術/に/は/です/ね | [domain] |
| 305 | 統計/ベース/機械/翻訳/と | [part of conjunction] |
| 306 | 規則/ベース/機械/翻訳/手法/と/いう | [complementizer] |
| 307 | まー/この/2/つ/の/方式/を/用い/て/おり/まし/て | [predicate] |
| 308 | で/二/つ/の/方式/を/合わ/せ/た/技術/を | [object] |
| 309 | えー/ハイブリッド/機械/翻訳/と/いう/ふう/に | [complementizer] |
| 310 | まあ/呼ん/で/いる/訳/です | [predicate] |

FIG. 3

501 — えー/まず/最初/に [sentence adverb] 202

502 — 機械/翻訳/技術/に/ついて [object] 402

503 — ご/紹介/し/たい/と/思い/ます/けれど/も [predicate] 《Clause end》

504 — えー/機械/翻訳/技術/に/は/です/ね [domain]

505 — 統計/ベース/機械/翻訳/と [part of conjunction]

506 — 規則/ベース/機械/翻訳/手法/と/いう [complementizer]

507 — まー/この/2/つ/の/方式/を/用い/て/おり/まし/て [predicate] 《Clause end》

508 — で/ニ/つ/の/方式/を/合わ/せ/た/技術/を [object]

509 — えー/ハイブリッド/機械/翻訳/と/いう/ふう/に [complementizer]

510 — まあ/呼ん/で/いる/訳/です [predicate] 《Sentence end》

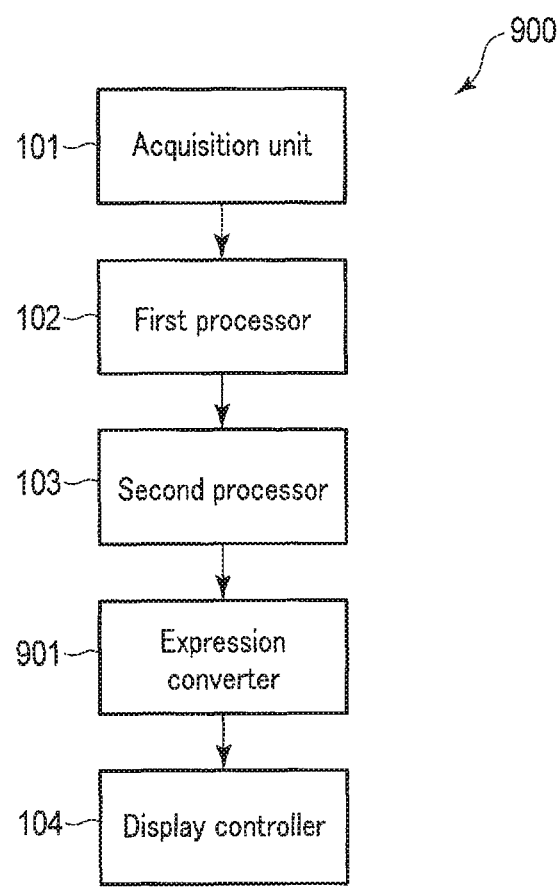
F I G. 9

| 1101 | 最初/に | [sentence adverb] |
| 1102 | 機械/翻訳/技術/に/ついて | [object] |
| 1103 | 紹介/し/ます | [predicate]《Clause end》 |
| 1104 | 機械/翻訳/技術/に/は | [domain] |
| 1105 | 統計/ベース/機械/翻訳/と | [part of conjunction] |
| 1106 | 規則/ベース/機械/翻訳/手法/と/いう | [complementizer] |
| 1107 | 2/つ/の/方式/を/用い/て/い/ます | [predicate] 《Sentence end》 |
| 1108 | 二/つ/の/方式/を/合わ/せ/た/技術/を | [object] |
| 1109 | ハイブリッド/機械/翻訳/と | [complementizer] |
| 1110 | 呼ん/で/い/ます | [predicate] 《Sentence end》 |

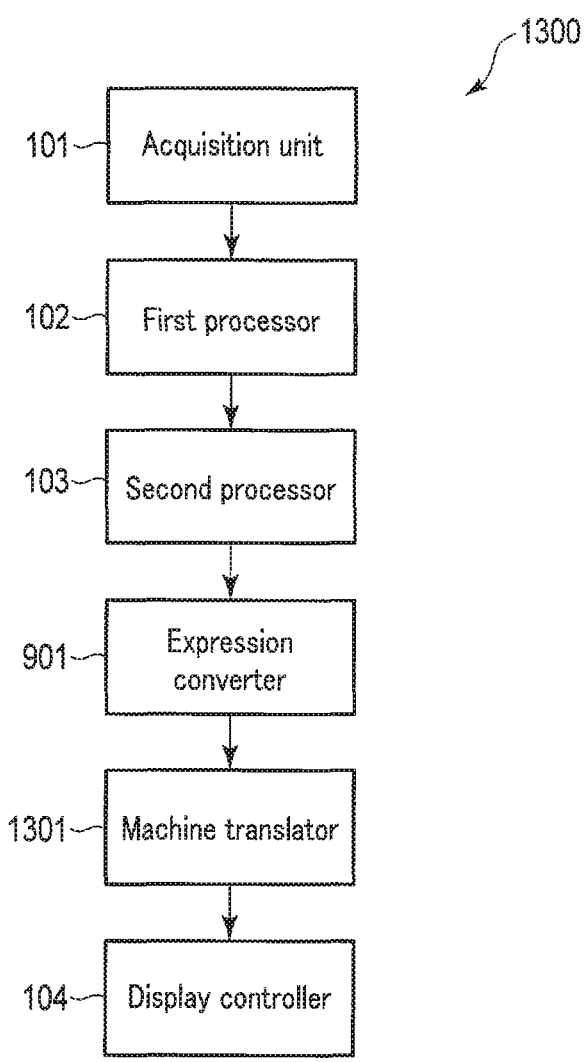
F I G. 13

```
                                                              ⸺ 1500
    first    ⸺ 1501
        about machine translation  ⸺ 1502
            we will introduce  ⸺ 1503
1504 {
    in machine translation  ⸺ 1505
        statistic machine translation and  ⸺ 1506
            rule based machine translation  ⸺ 1507
                we use two methods  ⸺ 1508
                                                              ⸺ 1509
    technology with two methods  ⸺ 1510
        as hybrid machine translation  ⸺ 1511
            we call  ⸺ 1512
                                                              ⸺ 1513
次に
    音声認識技術について
        紹介します
```

F I G. 15

| 1601 | それから最後に | And lastly, |
| --- | --- | --- |
| 1602 | 会議音声の活用システムということで | it's going to be about meeting speech's utilization system. |

| | これは会議でですね、 | In meetings, |
| --- | --- | --- |
| 1604 | 音声を文字に起こしたり、翻訳をするといったところを実は我々の中で使ってみましょうということでトライアルの開始をしようとしてまして、 | we are actually planning to start trials for transcribing and translating speeches. |
| | その紹介も含めて致します。 | Including that topic will be presented. |

FIG. 16A

| 1603 | それから最後に会議音声の活用システムということで | 然后最后是会议语音的有效利用系统 |
| --- | --- | --- |

| | これは会議でですね、 | 这是指在会议上, |
| --- | --- | --- |
| 1605 | 音声を文字に起こしたり、翻訳をするといったところを | 把语音速记成文字,并进行翻译, |
| 1606 | 実は我々の中で使ってみましょうということで | 我们想在我们中间实际开始试着用起来, |
| 1607 | トライアルの開始をしようとしてまして、その紹介も含めて致します。 | 连同尝试内容一起介绍。 |

FIG. 16B

| | |
|---|---|
| ゆくゆくは | Eventually, |
| 音声認識を我々はやってます【ので】 | 【as】 we are working on the speech recognition, |
| 自動的に字幕を作るとかですね、その場で聴覚の不自由な方にも講演内容を共有していただけるような取り組みもしていきたいと思っております | we would like to be able to automatically make the subtitle come out, and enable the deaf people to share the content of the symposium, these are the things we would like to work on. |

| | |
|---|---|
| ゆくゆくは | 将来的话， |
| 音声認識を我々はやってます【ので】 | 【因为】我们在做语音识别， |
| 自動的に字幕を作るとかですね、その場で聴覚の不自由な方にも講演内容を共有していただけるような取り組みもしていきたいと思っております | 【所以】将来想把它做成自动字幕，让在场的听觉不方便的人也可以分享到演讲内容， |

----------------------------------------------------------- ⌒2200 first ⌒2201
    we will introduce ⌒2202
        about machine translation ⌒2203

2204 { in machine translation ⌒2205
    we use two methods ⌒2206
        statistic machine translation and ⌒2207
            rule based machine translation ⌒2208

----------------------------------------------------------- ⌒2209 we call ⌒2210
    technology with two methods ⌒2211
        as hybrid machine translation ⌒2212

----------------------------------------------------------- ⌒2213

次に
    音声認識技術について
        紹介します

F I G. 22

| | | 2300　202 |
|---|---|---|
| 2301 | どのくらい/の/時間 | 【Speaker A】[Wh obj]　　402 |
| 2302 | 止まる/ん/です/か | 【Speaker A】[predicate][question]《Sentence end》 |
| 2303 | たぶん | 【Speaker B】[sentence adverb] |
| 2304 | 一/時間/位/で | 【Speaker B】[adverb] |
| 2305 | 終わる/と/思う/ん/です/よ | 【Speaker B】[predicate]《Sentence end》 |
| 2306 | その/同じ/現象/が | 【Speaker B】[agent] |
| 2307 | すぐ/に/起きれ/ば | 【Speaker B】[predicate][subjunctive] |
| 2308 | それ/で/復旧/し/て | 【Speaker B】[predicate] |
| 2309 | 終わり/なん/です/けど | 【Speaker B】[predicate]《Sentence end》 |
| 2310 | 明日/の | 【Speaker C】[sentence adverb] |
| 2311 | 十一/時/から/十二/時/まで/なら | 【Speaker C】[adverb][subjunctive] |
| 2312 | 問題/ない/です/よ | 【Speaker C】[predicate]《Sentence end》 |

FIG. 23

| | | |
|---|---|---|
| 2301 | どのくらい/の/時間 | 【Speaker A】[Wh obj] |
| 2302 | 止まる/ん/です/か | 【Speaker A】[predicate] [question]《Sentence end》 |
| 2303 | たぶん | 【Speaker B】[sentence adverb] |
| 2304 | 一/時間/位/で | 【Speaker B】[adverb] |
| 2305 | 終わる/と/思う/ん/です/よ | 【Speaker B】[predicate] 《Sentence end》 |
| 2306 | その/同じ/現象/が | 【Speaker B】[agent] |
| 2307 | すぐ/に/起きれ/ば | 【Speaker B】[predicate] [subjunctive] |
| 2308 | それ/で/復旧/し/て | 【Speaker B】[predicate] |
| 3001 | 終わり/ます | 【Speaker B】[predicate] 《Sentence end》 |
| 2310 | 明日/の | 【Speaker C】[sentence adverb] |
| 2311 | 十一/時/から/十二/時/まで/なら | 【Speaker C】[adverb] [subjunctive] |
| 2312 | 問題/ない/です/よ | 【Speaker C】[predicate] 《Sentence end》 |

FIG. 30

DISPLAY ASSIST APPARATUS, METHOD, AND PROGRAM

CROSS-REFERENCE TO RELATED APPLICATIONS

This application is based upon and claims the benefit of priority from Japanese Patent Application No. 2016-052394, filed Mar. 16, 2016, the entire contents of all of which are incorporated herein by reference.

FIELD

Embodiments described herein relate generally to a display assist apparatus, method, and program.

BACKGROUND

As a scene to display a speech recognition result as a subtitle, for example, there is a scene to display a speech recognition result as a subtitle for the purpose of information assurance in a meeting for a participant who cannot follow a speech and has difficulty in understanding the contents. Additionally, as a scene to display a translation result as a subtitle, there is a scene to display a machine translation result or manual translation result between different languages as a subtitle in, for example, a conference system used in a conference with participants using different languages as mother tongues.

When displaying subtitles as described above, if the subtitles are sequentially switched along with the progress of contents, or an old subtitle already displayed is gradually pushed out of the screen by a subtitle to be newly displayed, a user can see the subtitle for only a limited time. Hence, there exists a technique of dividing the sentence of a speech recognition result or translation result to be displayed as a subtitle to make the contents of the subtitle clear or improve translation quality.

BRIEF DESCRIPTION OF THE DRAWINGS

FIG. 2 is a view showing an example of a table that a first processor refers to;

FIG. 3 is a view showing an example of the processing result of the first processor;

FIG. 4 is a view showing an example of a table that a second processor refers to;

FIG. 5 is a view showing an example of the processing result of the second processor;

FIG. 7 is a view showing a detailed example of display control by the display controller according to the first embodiment;

FIG. 8A is a view showing a first other example of the display control of the display controller;

FIG. 8B is a view showing a second other example of the display control of the display controller;

FIG. 9 is a block diagram showing a display assist apparatus according to the second embodiment;

FIG. 10 is a view showing an example of a conversion pattern that an expression convertor refers to;

FIG. 11 is a view showing an example of the processing result of the expression convertor;

FIG. 12 is a view showing a detailed example of display control by a display controller according to the second embodiment;

FIG. 13 is a block diagram showing a display assist apparatus according to the third embodiment;

FIG. 15 is a view showing a detailed example of display control by a display controller according to the third embodiment;

FIG. 16A is a view showing an example of machine translation in Japanese-English translation concerning a first example in which the separation positions of divided character strings of a first language are changed;

FIG. 16B is a view showing an example of machine translation in Japanese-Chinese translation concerning a first example in which the separation positions of divided character strings of a first language are changed;

FIG. 18A is a view showing another example of the processing result of the machine translator in Japanese-English translation;

FIG. 18B is a view showing another example of the processing result of the machine translator in Japanese-Chinese translation;

FIG. 20 is a view showing a first example of a word order determination rule that a word order determiner refers to;

FIG. 22 is a view showing a detailed example of display control by a display controller according to the fourth embodiment;

FIG. 23 is a view showing an example of the processing result of a first processor according to the fifth embodiment;

FIG. 30 is a view showing another example of processing in a case in which an expression is converted by an expression convertor.

DETAILED DESCRIPTION

Figure 1:
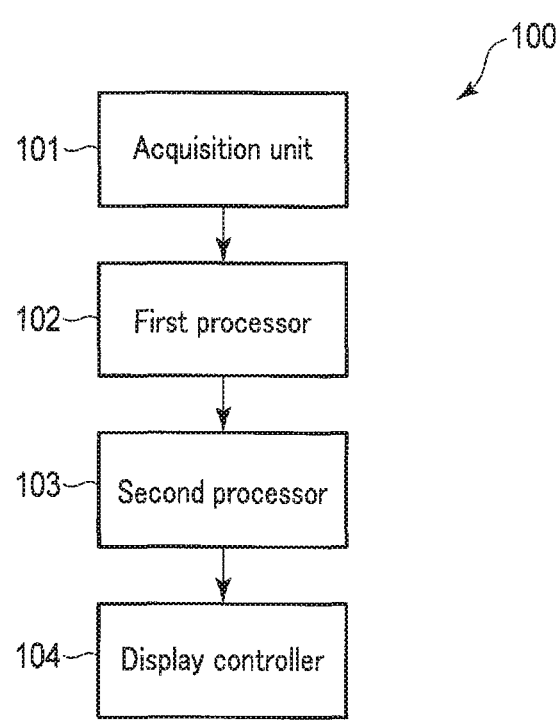
FIG. 1 is a block diagram showing a display assist apparatus according to the first embodiment.

A display assist apparatus, method, and program according to embodiments will now be described with reference to the accompanying drawings. Note that in the following embodiments, portions denoted by the same reference numerals perform the same operations, and a repetitive description will appropriately be omitted.

In an actual operation, however, if the divided sentences of a speech recognition result or translation result are directly displayed, it is difficult to grasp the separation positions between the elements of a subtitle. Additionally, since the sentence structure cannot sufficiently be analyzed, the understanding of a user who refers to the contents of the subtitle cannot keep up with the display, and information transmission may be impeded.

The present embodiments have been made to solve the above-described problem, and have as its object to provide a display assist apparatus, method, and program capable of assisting understanding of contents.

In general, according to one embodiment, a display assist apparatus includes an acquisition unit, a first processor, a second processor, and a display controller. The acquisition unit acquires a character string. The first processor divides the character string into first segments each of which is a segment representing a semantic cluster and generates a plurality of divided character strings. The second processor detects, for the character string, second segments each of which is a segment larger than the each of the first segments. The display controller performs display control to make a distinction between the first segments and the second segments when displaying the plurality of divided character strings.

First Embodiment

A display assist apparatus according to the first embodiment will be described with reference to the block diagram of FIG. 1.

A display assist apparatus 100 according to the first embodiment includes an acquisition unit 101, a first processor 102, a second processor 103, and a display controller 104.

The acquisition unit 101 acquires an input character string based on input from a user. As the input from the user, various generally used methods such as keyboard input, handwritten character recognition, and input to a microphone for receiving speech are applicable.

If the input from the user is done by speech, the acquisition unit 101 acquires the character string of the speech recognition result of the speech as the input character string, and acquires pause information as well. The acquisition unit 101 acquires, as the pause information, a state in which a silent period in the speech continues for a predetermined time or more. If a setting is done to start speech input after a button is pressed at the time of microphone input, the acquisition unit 101 may acquire the pause information by detecting, for example, ON/OFF of the button.

If the input from the user is done by text input such as keyboard input or handwritten character recognition processing, the acquisition unit 101 acquires determination information together with the input character string. The acquisition unit 101 acquires the pressing of the enter key or the input of a full stop or a period as the determination information. If a screen display such as a determination button configured to determine the input is included in the user interface, the acquisition unit 101 may acquire a touch or click by a mouse or the like on the display as the determination information.

The first processor 102 receives the input character string and the pause information or determination information from the acquisition unit 101. The first processor 102 performs morphological analysis for the input character string, and divides the input character string that has undergone the morphological analysis into first language segments (to be also simply referred to as first segments hereinafter) that are language segments each representing a semantic cluster based on the pause information or determination information, thereby generating a plurality of divided character strings.

As the morphological analysis, any general morphological analysis technology such as CKY or longest match principle is usable. Note that if the input character string acquired by the acquisition unit 101 already has information concerning a morphological analysis result, the first processor 102 need not perform the morphological analysis.

The first processor 102 adds a role label to each divided character string. Examples of the role label are a label representing the type of a case when a phrase serving as a case element is used, a label representing a simple sentence, a label representing a phrase located at a sentence end when a verbal phrase with a tense at a sentence end is used, a label representing a context when a conjunction or adverb representing the structure or context of a sentence or an expression corresponding to these is used, a label representing a parallel element when a parallel element is used, and a label representing a pause when a pause is used as one first language segment.

The second processor 103 receives the plurality of divided character strings with role labels from the first processor 102. The second processor 103 detects second language segments (to be also simply referred to as second segments hereinafter) that are language segments larger than the first language segments from the divided character strings. The second processor 103 adds an ending label to a divided character string at the end of a second language segment. Examples of the ending label are a label representing the end of a clause (to be also referred to as a clause end) or the end of a sentence (to be also referred to as a sentence end) and a label representing a compound sentence. The second processor 103 detects the label of a first language segment added to an input divided character string and the arrangement of pauses, determines the clause end or sentence end, and adds an ending label to the corresponding divided character string.

The display controller 104 receives the plurality of divided character strings with role labels (and ending labels) from the second processor 103. When displaying the plurality of divided character strings, the display controller 104 performs display control to make a distinction between the first language segments and the second language segments based on the role labels and the ending labels. The display control can be any control to make the relationship between the plurality of divided character strings distinguishable and allow the user to easily understand it. For example, when displaying a plurality of divided character strings on a display or the like, to make a first language segment distinguishable, indent display is done, the font color is changed, a decoration such as underlining or italicizing is applied, a blank line or a separator line is inserted after a divided character string as the end of a second language segment is displayed, or a graphic such as a so-called balloon surrounding a displayed first language segment is drawn. Details of the display control will be described later.

Figure 2:
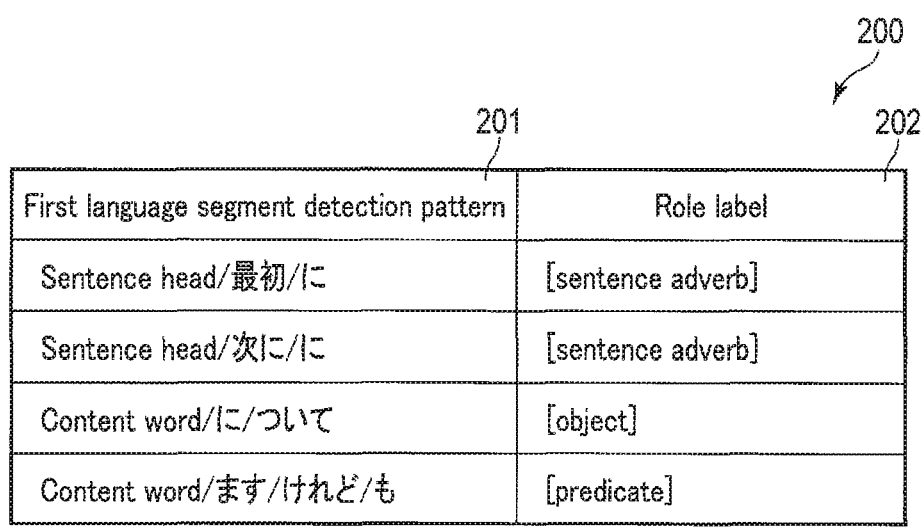

Next, FIG. 2 shows an example of a table that the first processor 102 refers to.

In a table 200 shown in FIG. 2, a first language segment detection pattern 201 and a role label 202 are stored in association with each other.

The first language segment detection pattern 201 is a pattern used to divide an input character string into first language segments. Here, character string patterns each appearing at a sentence head when an input character string is divided into phrases and character string patterns each appearing at an end when an input character string is divided into phrases are shown. The role label 202 is a label representing the feature of the first language segment detection pattern 201. Here, the role label 202 is a label representing the type of a case. The first processor 102 determines whether a morpheme string that is a character string as the morphological analysis result of an input character string coincides with the first language segment detection pattern 201. Upon determining that the morpheme string coincides with the first language segment detection pattern 201, the first processor 102 generates a divided character string by setting a separation position at the end of the morpheme string, and adds the role label 202 corresponding to the coincident first language segment detection pattern 201 to the divided character string.

More specifically, for example, the first language segment detection pattern 201 "sentence head/最初/に" and the role label 202 "[sentence adverb]" are associated. Note that in FIG. 2, "sentence head" of the first language segment detection pattern 201 is obtained by referring to the character string immediately after pause information or determination information, and "content word" represents a character string that appears in the input character string.

Note that if pause information or determination information exists immediately after a morpheme located at the end of a divided character string, the information may be added to the divided character string as a role label.

Next, FIG. 3 shows an example of the processing result of the first processor 102.

By the first processor 102, a processing result of divided character strings 301 to 310 as shown in FIG. 3 and the role labels 202 added to the divided character strings can be obtained. More specifically, when the table 200 is referred to, the divided character string 301 "え-/まず/最初/に" coincides with the first language segment detection pattern 201 "sentence head/最初/に". Hence, the corresponding role label 202 "[sentence adverb]" is added to the divided character string 301.

Figure 4:
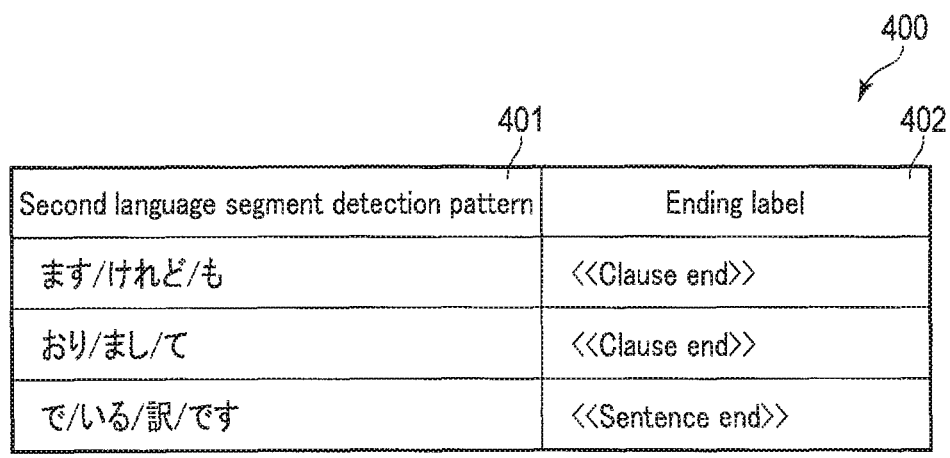

Next, FIG. 4 shows an example of a table that the second processor 103 refers to.

In a table 400 shown in FIG. 4, a second language segment detection pattern 401 and an ending label 402 are stored in association with each other.

Here, the second language segment detection pattern 401 is a character string pattern that is, here, a language segment larger than a phrase and appears at a clause end or a sentence end in terms of grammar. The ending label 402 is a label representing a clause end or a sentence end. More specifically the second language segment detection pattern 401 "ます/けれど/も" and the ending label 402 "<<clause end>>" are associated.

The second processor 103 determines whether a divided character string coincides with the second language segment detection pattern 401. Upon determining that the divided character string coincides with the second language segment detection pattern 401, the second processor 103 adds the ending label 402 corresponding to the coincident second language segment detection pattern 401 to the divided character string.

An example of the processing result of the second processor 103 will be described next with reference to FIG. 5.

By the second processor 103, a processing result of divided character strings 501 to 510 as shown in FIG. 5 and the role labels 202 and the ending labels 402 added to the divided character strings can be obtained.

More specifically, when the table 400 is referred to, the divided character string 503 ".../ます/けれど/も" coincides with the second language segment detection pattern 401 "ます/けれど/も". Hence, the corresponding ending label 402 "<<clause end>>" is added to the divided character string 503. Similarly, when the table 400 is referred to, the divided character string 510 "で/いる/訳/で す" coincides with the second language segment detection pattern 401 "で/いる/訳/です". Hence, the corresponding ending label 402 "<<sentence end>>" is added to the divided character string 510.

The operation of the display controller 104 will be described next with reference to the flowchart of FIG. 6. Note that in a description of FIG. 6, "display" means that the display controller 104 controls to cause a display device (not shown) such as an external display to display a character string or a graphic, for example, display a subtitle or a telop. In addition, the display controller 104 is assumed to hold a variable concerning the number of indents to be used when displaying a divided character string.

In step S601, the display controller 104 sets the number of indents to 0.

In step S602, the display controller 104 displays a separator line at the start of display.

In step S603, the display controller 104 inserts the set number of indents and displays a divided character string. Note that in the processing of the first time, since the number of indents is 0, the display controller 104 displays the divided character string from the beginning of the line.

In step S604, the display controller 104 determines whether the divided character string displayed in step S603 is a sentence end, that is, whether a sentence end label is added to the divided character string. If a sentence end label is added, the process advances to step S608. If no sentence end label is added, the process advances to step S605.

In step S605, the display controller 104 determines whether the divided character string displayed in step S603 is a clause end, that is, whether a clause end label is added. If a clause end label is added, the process advances to step S609. If no clause end label is added, the process advances to step S606.

In step S606, the display controller 104 increments the set number of indents by one.

In step S607, the display controller 104 determines whether a next divided character string exists. If a next divided character string exists, the process returns to step S603 to repeat the same processing as described above. If a next divided character string does not exist, the process advances to step S610.

In step S608, since the end of the sentence can be known by the sentence end label, the display controller 104 displays a separator line and sets the number of indents to 0. After that, the process returns to step S603 to repeat the same processing as described above.

In step S609, since the end of the clause can be known by the clause end label, the display controller 104 displays a blank line and sets the number of indents to 0. After that, the process returns to step S603 to repeat the same processing as described above.

In step S610, the display controller 104 displays a separator line. The operation of the display controller 104 thus ends.

Figure 7:
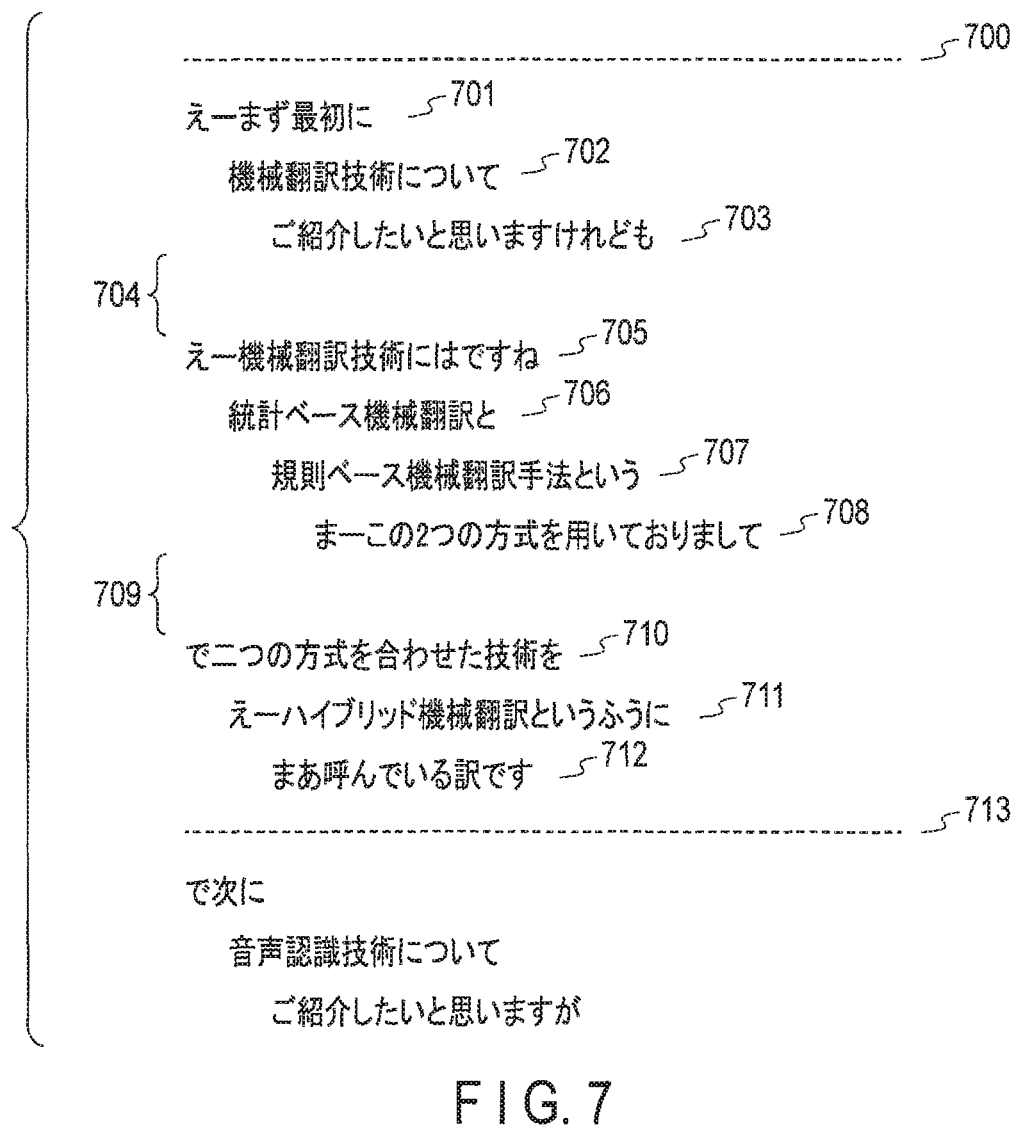

A detailed example of display control by the display controller 104 according to the first embodiment will be described with reference to FIG. 7.

Here, an example in which display control is performed for the processing result of the second processor 103 shown in FIG. 5, and the result is displayed as subtitles on a display or a screen is shown. The divided character string 501 is the first divided character string, and the number of indents for the divided character string is 0. For this reason, after a separator line 700 at the start is displayed, the divided character string 501 is displayed (display 701). Since the divided character string 501 has neither a sentence end label nor a clause end label, the number of indents is incremented by one and changed to 1 in step S606.

For the divided character string 502, the number of indents is 1. Hence, the divided character string 502 is displayed from a display start position that is moved rightward by one interval (to be referred to as one indent) defined as an indent (display 702). Note that since FIG. 7 shows an example of horizontal writing in Japanese, the indention is done rightward. For vertical writing, the indention is done downward. For a language such as Arabic that is written from right to left, the indention is done leftward.

Since the divided character string 502 has neither a sentence end label nor a clause end label, like the divided character string 501, the number of indents is incremented by one and changed to 2.

For the next divided character string 503, the number of indents is 2. Hence, the divided character string 503 is displayed from a position moved rightward by two indents (display 703).

Since a clause end label is added to the divided character string 503, a blank line 704 is displayed after the display 703, and the number of indents is reset to 0 by the process of step S609.

If the same processing as described above is performed for the divided character strings 504 to 509, displays 705 to 708, a blank line 709, and displays 710 to 712 are displayed.

Note that when processing the last divided character string 510, since the divided character string 510 has a sentence end label, the display 712 is displayed, and then, a separator line 713 at the end is displayed by the process of step S610.

Note that after display of a divided character string with a clause end label, not a blank line but a separator line distinguishable from those at the start and end of the sentence may be displayed. That is, any display format capable of making a distinction between a clause end and a sentence end is usable.

Figure 8A:
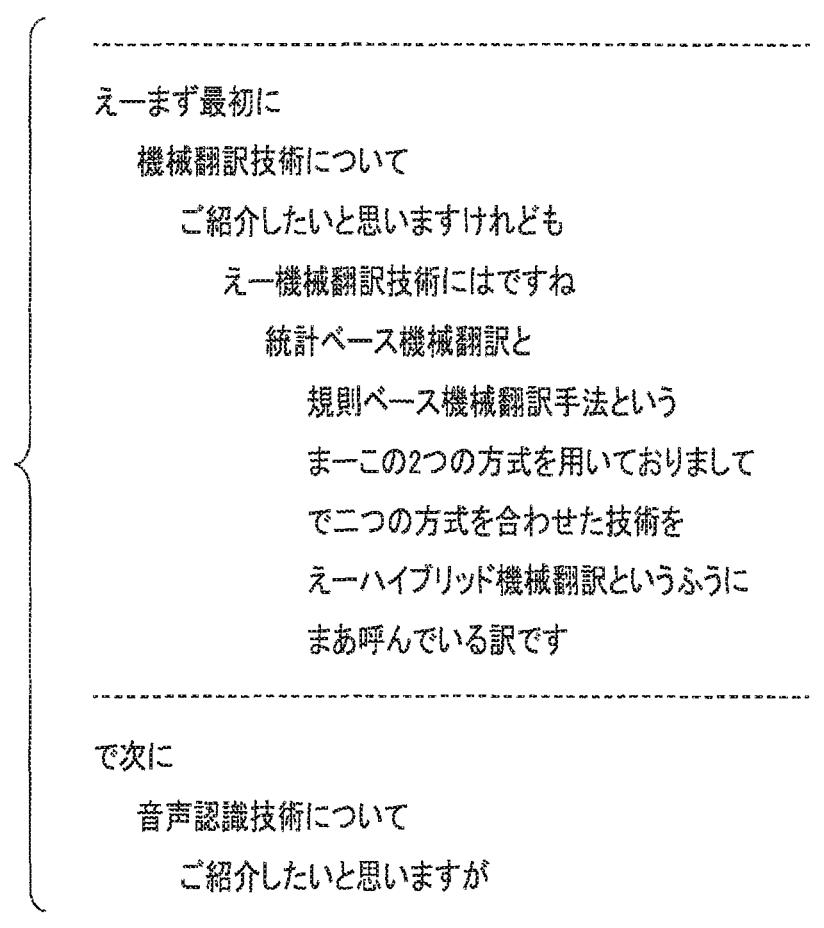

Other examples of the display control of the display controller 104 will be described next with reference to FIGS. 8A and 8B.

Here, assume that the divided character strings 501 to 510 shown in FIG. 5 form one clause, for the descriptive convenience.

Figure 6:
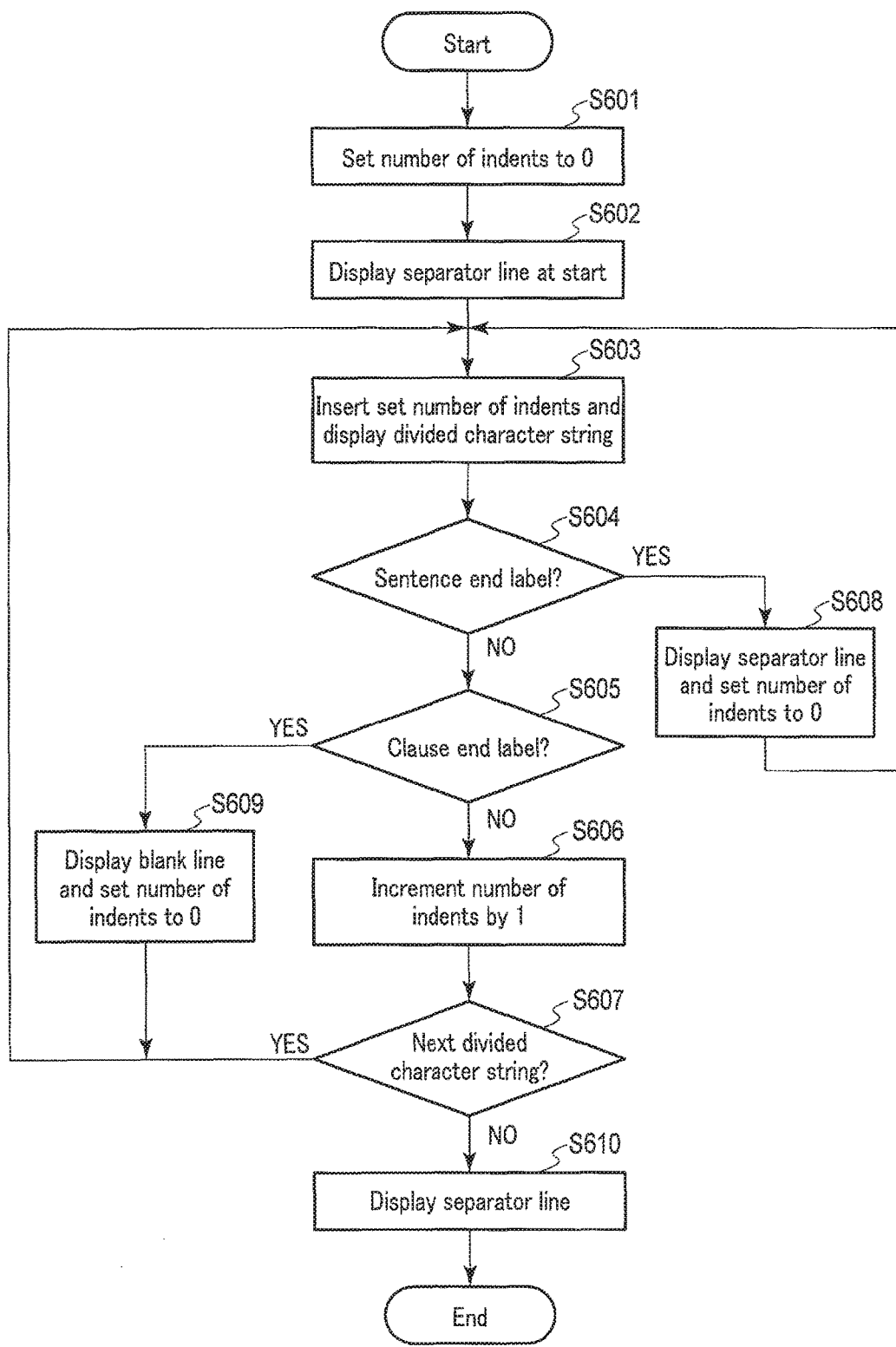
FIG. 6 is a flowchart showing the operation of a display controller according to the first embodiment.

In a case in which a character string up to one clause end is long, if the processing is performed according to the flowchart of FIG. 6, the number of indents increases, and a sentence may be unable to fit in the display surface of a display or the like. In this case, for example, as shown in FIG. 8A as a first other example, if the number of indents reaches a threshold, display may be done without changing the number of indents any more. For example, if the threshold of the number of indents is 5, the number of indents is not increased to 6 or more, and the subsequent divided character string is displayed while keeping the number of indents at 5. For a divided character string displayed with the same number of indents, processing for increasing visibility to the user may be performed by, for example, reducing the font size or changing the font color.

Alternatively, as shown in FIG. 8B as a second other example, if the number of indents reaches a threshold, the number of indents may be reset to 0, and display may be repeated until the number of indents reaches the threshold again.

According to the above-described first embodiment, when displaying divided character strings, display control is done to make a distinction between first language segments and second language segments, thereby performing display such that the difference between segments such as phrase segments, clause segments, and sentence segments can be seen. This can increase the visibility of a character string displayed as a subtitle or a telop and assist the user in understanding the contents.

Second Embodiment

A display assist apparatus according to the second embodiment will be described with reference to the block diagram of FIG. 9.

A display assist apparatus 900 according to the second embodiment includes an acquisition unit 101, a first processor 102, a second processor 103, a display controller 104, and an expression convertor 901.

The operations of the acquisition unit 101, the first processor 102, and the second processor 103 are the same as in the first embodiment, and a description thereof will be omitted here.

The expression convertor 901 receives divided character strings with role labels (and ending labels) from the second processor 103, and converts the expression of a divided character string corresponding to a conversion rule to another expression. Note that the expression convertor 901 may receive not divided character strings processed by the second processor 103 but a character string that has undergone morphological analysis from the first processor 102, and convert, based on the conversion rule, the expression of the input character string that has undergone the morphological analysis. At this time, the first processor 102 sends the converted input character string to the second processor 103.

The display controller 104 performs display control for the converted divided character string.

An example of a conversion pattern that the expression convertor 901 refers to will be described next with reference to FIG. 10.

Figure 10:
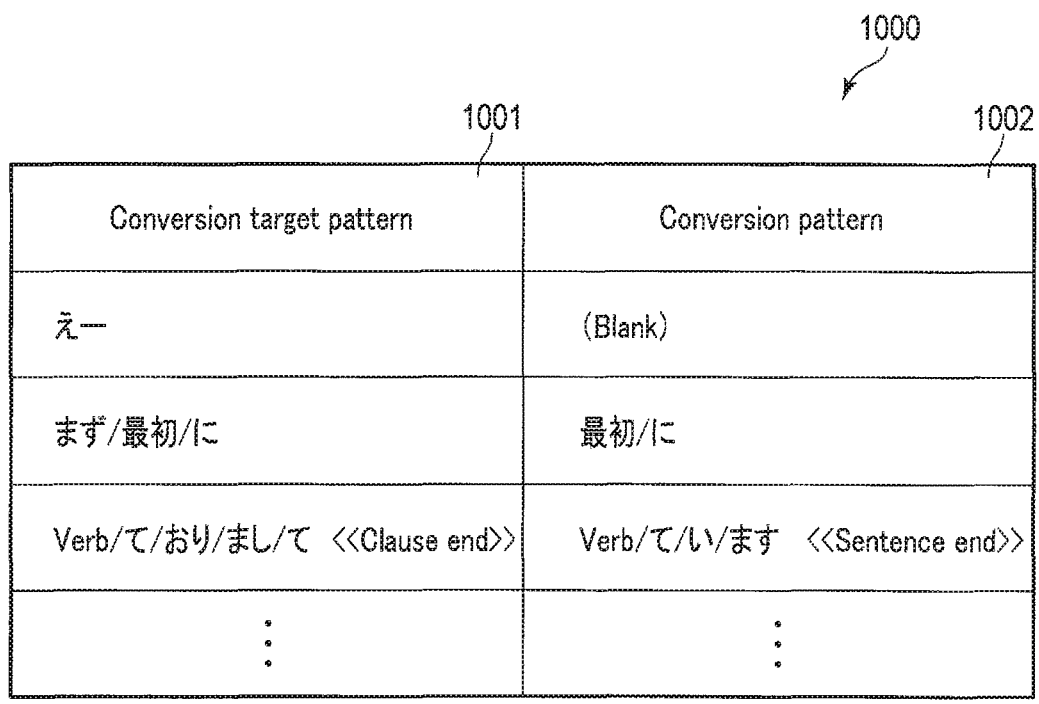

In a table 1000 shown in FIG. 10, a conversion target pattern 1001 and a conversion pattern 1002 are stored in association with each other. The conversion target pattern 1001 is the pattern of a character string as a conversion target. The conversion pattern 1002 is a pattern showing how to convert the conversion target pattern 1001. In the example shown in FIG. 10, a pattern used to remove stammering, repeat, misstatement, filler, or the like is used as the conversion pattern 1002.

More specifically, the conversion target pattern 1001 "えー" and the conversion pattern 1002 "(blank)" are associated. That is, if a filler "えー" exists, "えー" is deleted.

Note that the example of FIG. 10 assumes so-called sentence arrangement processing of removing a filler and the like. However, the present embodiments are not limited to this, and various kinds of expression conversion may be performed, such as conversion from a spoken language to a written language and vice versa, conversion from a dialect to a standard language and vice versa, conversion from a dialect in a region to a dialect in another region, and conversion from a standard language to a so-called character language spoken by a character.

FIG. 11 shows an example of the processing result of the expression convertor 901.

FIG. 11 shows an example in which the expression convertor 901 performs divided character string expression conversion for the processing result of the second processor 103 shown in FIG. 5.

For example, as for a divided character string 1101, fillers are removed from a divided character string 501 "え ー/まず/ 最初/に" in the example of FIG. 5, and the expression is converted into "最初/に" by the processing of the expression convertor 901.

As for a divide character string 1107, a divided character string 507 "まー/この/2/つ/の/方式/を/用い/て/おり/まし/ て" with a clause end label in the example of FIG. 5 is converted into "2/つ/の/方式/を/用い/て/い/ます", and the clause end label is converted into a sentence end label by the processing of the expression convertor 901.

FIG. 12 shows a detailed example of display control by the display controller 104 according to the second embodiment. As shown in FIG. 12, display is done after removing redundant words such as fillers displayed in FIG. 7. In addition, a separator line 1209 is displayed on the line under a display 1208 of the divided character string whose clause end label is converted into a sentence end label. This can obtain display that allows the user to more easily understand the contents of the subtitle.

According to the above-described second embodiment, the expression convertor converts the expression of a divided character string to perform sentence arrangement processing, thereby displaying a subtitle more easily readable by the user and assisting the user in understanding the contents. If an expression is converted into another expression such as a dialect, a wider range of variations in subtitle display can be implemented.

Third Embodiment

A display assist apparatus according to the third embodiment will be described with reference to the block diagram of FIG. 13.

A display assist apparatus 1300 according to the third embodiment includes an acquisition unit 101, a first processor 102, a second processor 103, a display controller 104, an expression convertor 901, and a machine translator 1301.

The operations of the acquisition unit 101, the first processor 102, the second processor 103, and the expression convertor 901 are the same as in the second embodiment, and a description thereof will be omitted here.

The machine translator 1301 receives a plurality of divided character strings converted as needed from the expression convertor 901, and machine-translates the plurality of divided character strings from a first language to a second language. As the method of machine translation, any translation engine used in general such as a rule based machine translation engine, an example based machine translation engine, or a statistic machine translation engine can be used.

The display controller 104 performs display control for the plurality of machine-translated divided character strings.

An example of the processing result of the machine translator 1301 will be described next with reference to FIG. 14.

Figure 14:
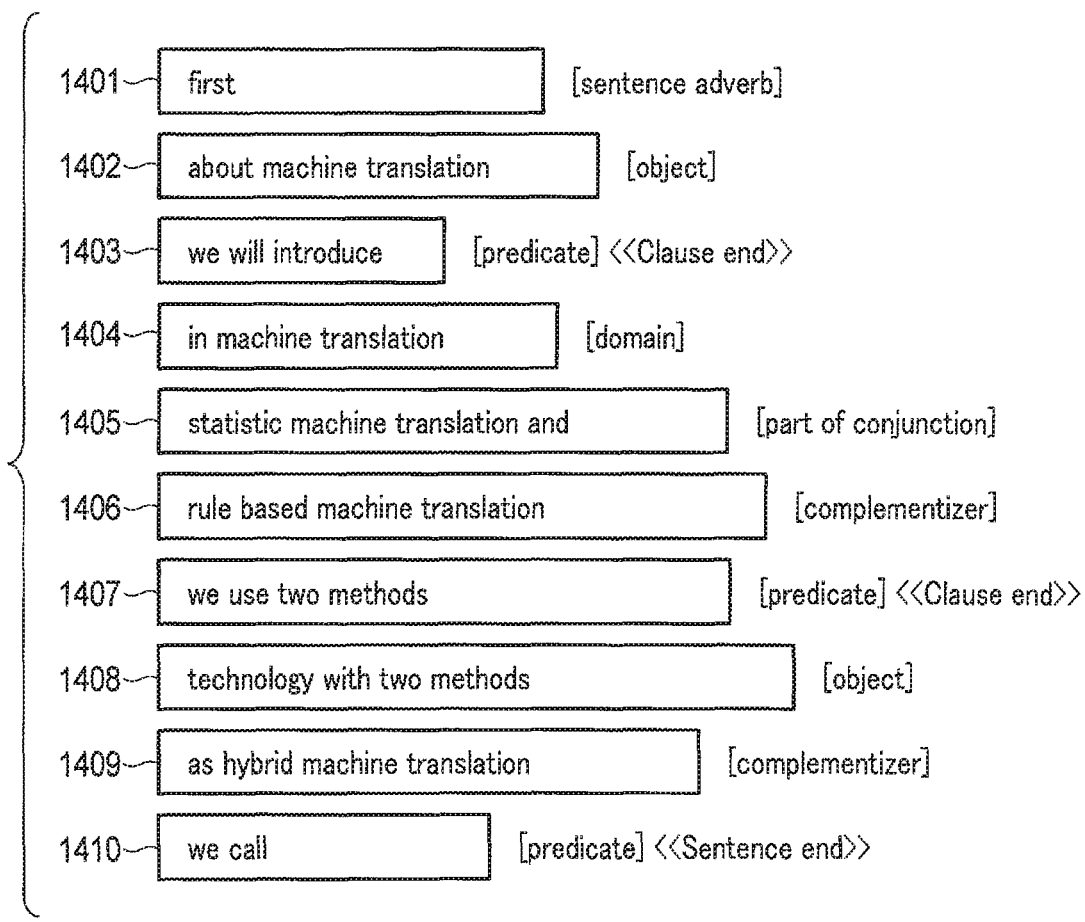
FIG. 14 is a view showing an example of the processing result of a machine translator.

FIG. 14 shows an example in which machine translation processing is performed for divided character strings 1101 to 1110 whose expressions are converted by the expression convertor 901 shown in FIG. 11. Here, a case in which Japanese as the first language is translated to English as the second language (to be referred to as Japanese-English translation) is shown. As indicated by divided character strings 1401 to 1410, the translation can be done on a divided character string basis. Note that already added labels are held unchanged.

A detailed example of display control by the display controller 104 according to the third embodiment will be described with reference to FIG. 15. When translated contents are displayed as subtitles as shown in FIG. 15, even a user who can understand the second language can more easily grasp the contents.

Note that when translating the first language to the second language, it may be preferable to change the length of a divided character string as a translation segment depending on the type of the second language. For example, in the Japanese-English translation and in a case in which Japanese is translated to Chinese (to be referred to as Japanese-Chinese translation), the translation segment is set according to each language. Hence, it is preferable to change the positions (divided character string separation positions) to separate an input character string into divided character strings.

A first example in which the divided character string separation positions of the first language change depending on the difference in the grammar according to the type of the second language will be described with reference to FIGS. 16A and 16B.

FIG. 16A shows an example of machine translation in Japanese-English translation. FIG. 16B shows an example of machine translation in Japanese-Chinese translation.

In the Japanese-English translation shown in FIG. 16A, an input character string in Japanese is divided into a divided character string 1601 "それから最後に" and a divided character string 1602 "会議音声の活用 ｌシステムということで". In the Japanese-Chinese translation shown in FIG. 16B one character string 1603 "それから最後に 会議音声の活 用システムという ことで" in Japanese is formed.

Conversely, in the Japanese-English translation shown in FIG. 16A, one divided character string 1604 "音声を文字に 起こしたり、翻訳をするとい ったところを実 は我々の中で使 ってみましょうと いうことでト ライアルの開 始をしようと してまして" is formed. In the Japanese-Chinese translation shown in FIG. 16B, the character string is divided into a divided character string 1605 "音声を文字に 起こしたり、翻訳をするとい ったところを", a divided character string 1606 "実は我々の中 で使ってみまし ょうということで", and part "トライアルの 開始をしようとしてまして . . ." of a divided character string 1607.

As for the determination the translation segment as described above, the machine translator 1301 receives information (to be also referred to as target language information) about the type of the second language, and connects or divides divided character strings in the second language segment based on the preset translation segment rule of the language. The target language information may be acquired based on a user designation. If the second language is determined in advance, the first processor 102 may refer to the translation segment rule and generate divided character strings in the process of generating divided character strings.

A second example in which the divided character string separation positions of the first language change depending on the difference in the grammar of the second language will be described next with reference to FIGS. 17A and 17B.

Figure 17A:
FIG. 17A is a view showing an example of machine translation in Japanese-Chinese translation concerning a second example in which the separation positions of divided character strings of a first language are changed.

FIG. 17A shows an example of machine translation in Japanese-Chinese translation. FIG. 17B shows an example of machine translation in Japanese-English translation.

Generally, in the Japanese-Chinese translation, Chinese corresponding to Japanese contents can be displayed as a subtitle because the number of characters is often smaller in Chinese than in Japanese. On the other hand, in the Japanese-English translation, the number of characters in English may be larger than in Japanese. Hence, translation of inessential contents may be inhibited to prevent characters from extending off the display space for subtitles.

In the Japanese-Chinese translation shown in FIG. 17A, a divided character string 1701 "宜しく願いします" is translated to corresponding Chinese "请多关照". In the Japanese-English translation shown in FIG. 17B, however, since the number of characters needs to be decreased, and a translation representing corresponding contents does not exist, the translation of the divided character string 1701 "宜しく願いします" is omitted.

Figure 17B:
FIG. 17B is a view showing an example of machine translation in Japanese-English translation concerning a second example in which the separation positions of divided character strings of a first language are changed.

The machine translator 1301 defines a keyword not to be translated to a translated sentence in advance as a translation segment rule and performs the translation processing as shown in FIG. 17A or 17B.

Other examples of the processing of the machine translator 1301 will be described with reference to FIGS. 18A and 18B.

FIG. 18A shows an example of machine translation in Japanese-English translation. FIG. 18B shows an example of machine translation in Japanese-Chinese translation.

Depending on the type of the second language, a natural sentence can sometimes be obtained as a translation corresponding to one divided character string by reflecting the translation result on the translated sentences of two divided character strings. For example as shown in FIG. 18A, the machine translator 1301 translates a divided character string 1801 "音声認識を我々はやって ますので" in Japanese into "as we are working on the speech recognition" in English. Here, "as" corresponding to "ので" is translated as the translated sentence of the corresponding divided character string.

On the other hand, as shown in FIG. 18B, when translating "ので" of the divided character string 1801 in Japanese into Chinese, the machine translator 1301 performs translation such that corresponding translations appear in the translated sentences of two divided character strings "因为" 1802 and "所以" 1803.

The machine translator 1301 defines a keyword that should appear in the translated sentences of two divided character strings in advance as a translation segment rule and performs the translation processing as shown in FIG. 18A or 18B.

According to the above-described third embodiment, contents translated from the first language to the second language are displayed, thereby allowing even a user who can understand the second language to more easily grasp the contents and assisting the user in understanding the contents.

Fourth Embodiment

Figure 19:
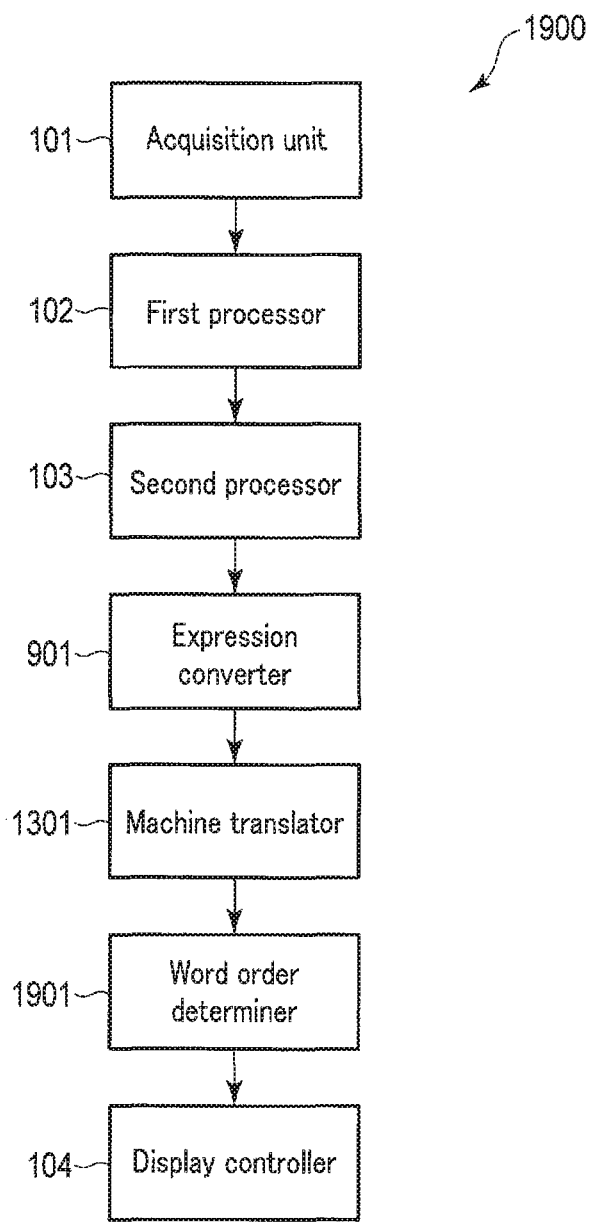
FIG. 19 is a block diagram showing a display assist apparatus according to the fourth embodiment.

A display assist apparatus according to the fourth embodiment will be described with reference to the block diagram of FIG. 19.

A display assist apparatus 1900 according to the fourth embodiment includes an acquisition unit 101, a first processor 102, a second processor 103, a display controller 104, an expression convertor 901, a machine translator 1301, and a word order determiner 1901.

The operations of the acquisition unit 101, the first processor 102, the second processor 103, the expression convertor 901, and the machine translator 1301 are the same as in the third embodiment, and a description thereof will be omitted here.

The word order determiner 1901 receives divided character strings that have undergone translation processing from the machine translator 1301 and determines the display order of the plurality of divided character strings based on the word order determination rule of the second language. That is, the word order determiner 1901 rearranges the plurality of divided character strings to obtain a natural order according to the grammatical order of the second language. In addition, the word order determiner 1901 re-adds ending labels again as needed. Note that the word order determiner 1901 may rearrange the plurality of divided character strings in the stage of the first language if the order is unnatural because of inversion or the like.

The display controller 104 performs display control for the rearranged divided character strings.

A first example of the word order determination rule that the word order determiner 1901 refers to will be described next with reference to FIG. 20.

Figure 20:

In a word order determination rule table 2000 shown in FIG. 20, a first language word order pattern 2001 and a second language word order pattern 2002 are stored in association with each other. FIG. 20 shows an example in which the first language is Japanese, and the second language is English. Here, the word order is determined by the order of role labels that are added to divided character strings and arranged in the natural word order for English.

More specifically, for example, the word order pattern 2001 of Japanese "[sentence adverb]→[object]→[predicate]" and the word order pattern 2002 of English "[sentence adverb]→[predicate]→[object]" are associated with each other.

Figure 21:
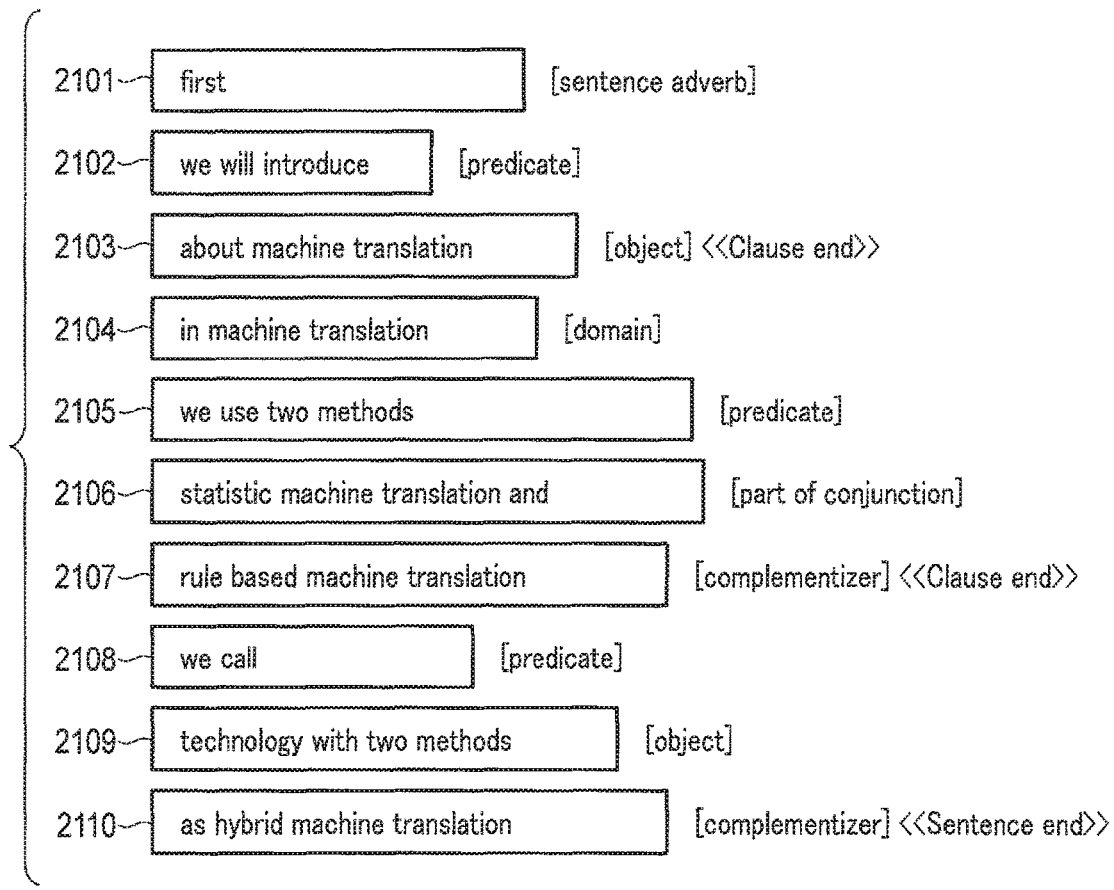
FIG. 21 is a view showing an example of the processing result of the word order determiner.

An example of the processing result of the word order determiner 1901 will be described next with reference to FIG. 21.

In the above-described example of FIG. 14 before word order rearrangement, divided character strings 1401 to 1403 in the second language segment are arranged in an order of "first [sentence adverb]", "about machine translation [object]", and "we will introduce [predicate]<<clause end>>".

Based on the word order determination rule, the word order determiner 1901 rearranges the divided character strings 1401 to 1403 in an order of [sentence adverb]→[predicate]→[object]. In addition, the word order determiner 1901 re-adds the ending label to the last divided character string in the second language segment. As a result, divided character strings 2101 to 2103 are arranged in an order of "first [sentence adverb]"→"we will introduce [predicate]"→"about machine translation [object]<<clause end>>". Note that the re-addition of the ending label may be done by the second processor 103.

A detailed example of display control by the display controller 104 according to the fourth embodiment will be described next with reference to FIG. 22.

As shown in FIG. 22, after the word order is changed, the display order of the translated sentences is [first], [we will introduce], and [about machine translation]. Hence, the translated sentences are displayed in the natural order as the grammar of the second language.

According to the above-described fourth embodiment, the word order determiner 1901 rearranges the plurality of divided character strings to obtain a natural order according to the grammatical order of the second language, thereby displaying a more natural subtitle for a user who uses the second language and assisting the user in understanding the contents.

Fifth Embodiment

In the fifth embodiment, assume a case in which a plurality of speakers use the first language.

A display assist apparatus according to the fifth embodiment is implemented using a display assist apparatus mentioned in any one of the above-described embodiments.

In addition to an input character string, an acquisition unit 101 according to the fifth embodiment acquires speaker information that is unique to each speaker and is used to identify a speaker who inputs (utters) the input character string. As a method of acquiring speaker information, for example, the speaker information may be acquired by preparing a microphone connected to the acquisition unit 101 for each speaker. Alternatively, the speaker information may be acquired by identifying a speaker using a general speaker identifying technology using beam forming or a speech feature amount.

A first processor 102 receives the input character string and the speaker information from the acquisition unit 101, and adds, to each of a plurality of divided character strings obtained in the same way as in the above-described embodiments, a speaker label used to classify a divided character string for each speaker based on the speaker information.

A display controller 104 receives the plurality of divided character strings with speaker labels from a second processor 103. When displaying the plurality of divided character strings, the display controller 104 performs display control to make a distinction between first language segments and second language segments while making a distinction between speakers based on the speaker labels.

FIG. 23 shows an example of the processing result of the first processor 102 according to the fifth embodiment.

As shown in FIG. 23, speaker labels 2300 are added in addition to role labels 202 and ending labels 402.

As the speaker label determination method, for example, if user identification information (an IP address or user identification information including a user ID) can be obtained in advance based on the speaker information acquired by the acquisition unit 101, the speaker may be identified in accordance with the identification information. Alternatively, labels such as speaker A and speaker B that enable to make a distinction between different pieces of speaker information may be added.

Figure 24:
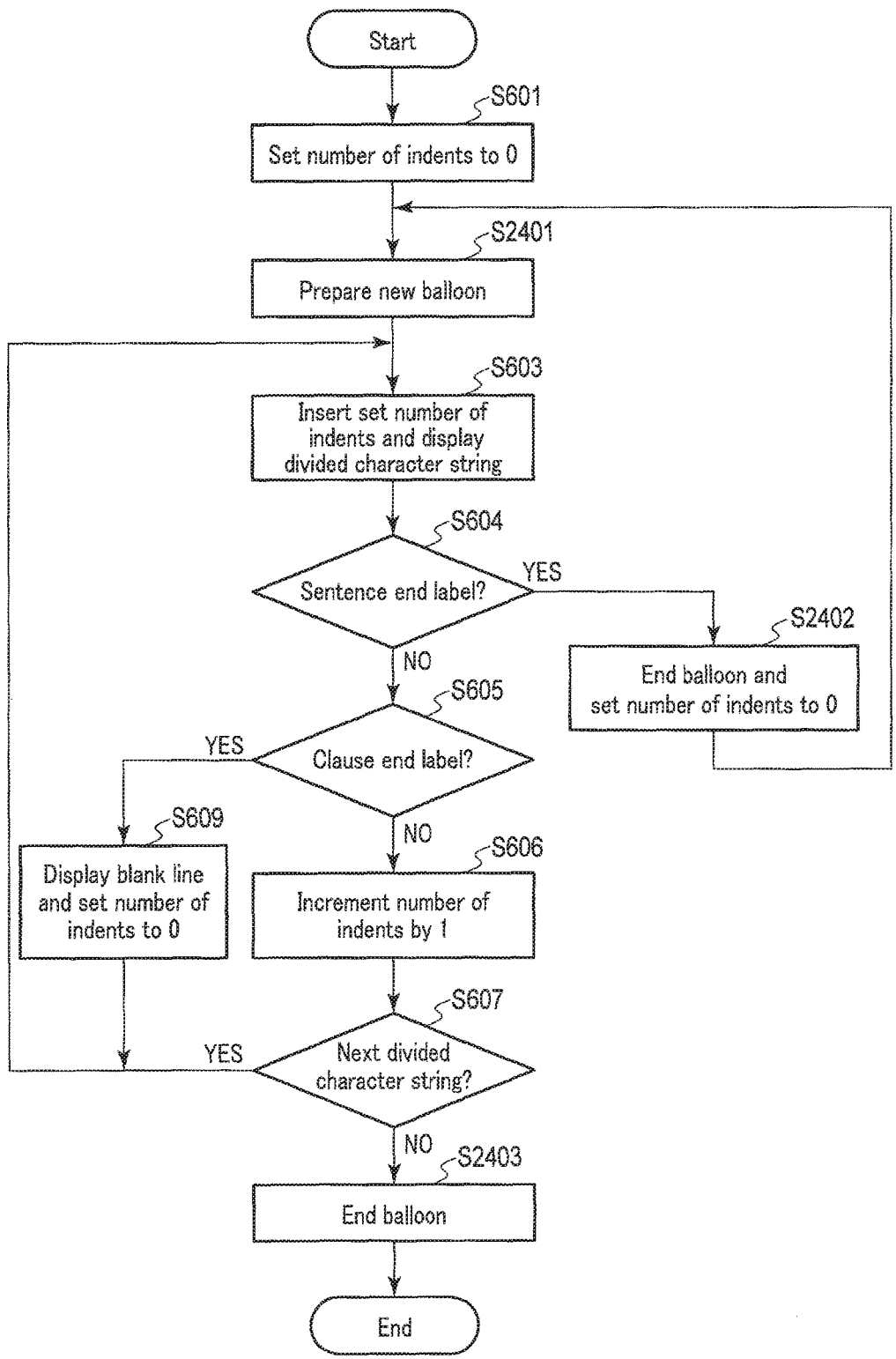
FIG. 24 is a flowchart showing the operation of a display controller according to the fifth embodiment.

The operation of the display controller 104 according to the fifth embodiment will be described next with reference to the flowchart of FIG. 24.

The processes of steps S601, S603 to S607, and S609 are the same as in the above-described embodiment, and a description thereof will be omitted.

In step S2401, the display controller 104 prepares a new balloon.

In step S2402, since a sentence end label is added to a divided character string, the display controller 104 ends the current balloon and sets the number of indents to 0. The process returns to step S2401 to repeat the same processing as described above. Accordingly, one sentence is expressed by one balloon.

In step S2403, since the processing has ended for all divided character strings, the balloon is ended. The process returns to step S2401 to repeat the same processing as described above.

Note that processing of making the distinction between speakers clearer may be performed by, for example, changing the outline or outline color of a balloon for each speaker. In the fifth embodiment, a balloon is assumed to be used to distinguish a speaker. However, any display is usable as long as each speaker can be distinguished.

Figure 25:
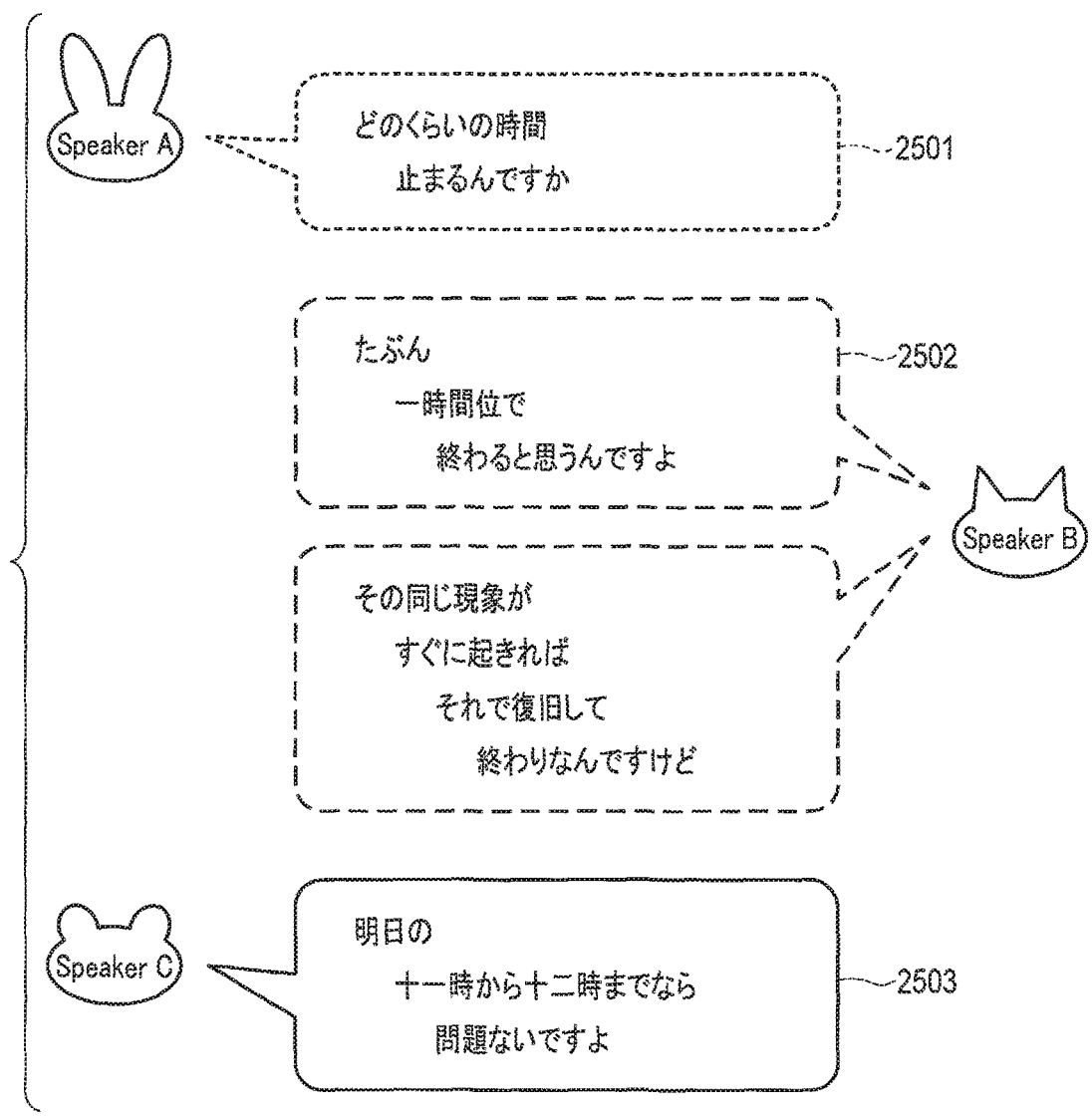
FIG. 25 is a view showing a detailed example of display control by the display controller according to the fifth embodiment.

FIG. 25 shows a detailed example of display control by the display controller 104 according to the fifth embodiment.

FIG. 25 shows an example in which display control is performed for the processing result of the second processor 103 shown in FIG. 23. A balloon 2501 is displayed for an utterance of a speaker A, a balloon 2502 is displayed for an utterance of a speaker B, and a balloon 2503 is displayed for an utterance of a speaker C. That is, a balloon is displayed for each speaker and also for each sentence, thereby improving the visibility of a subtitle.

First Modification of Fifth Embodiment

Figure 26:
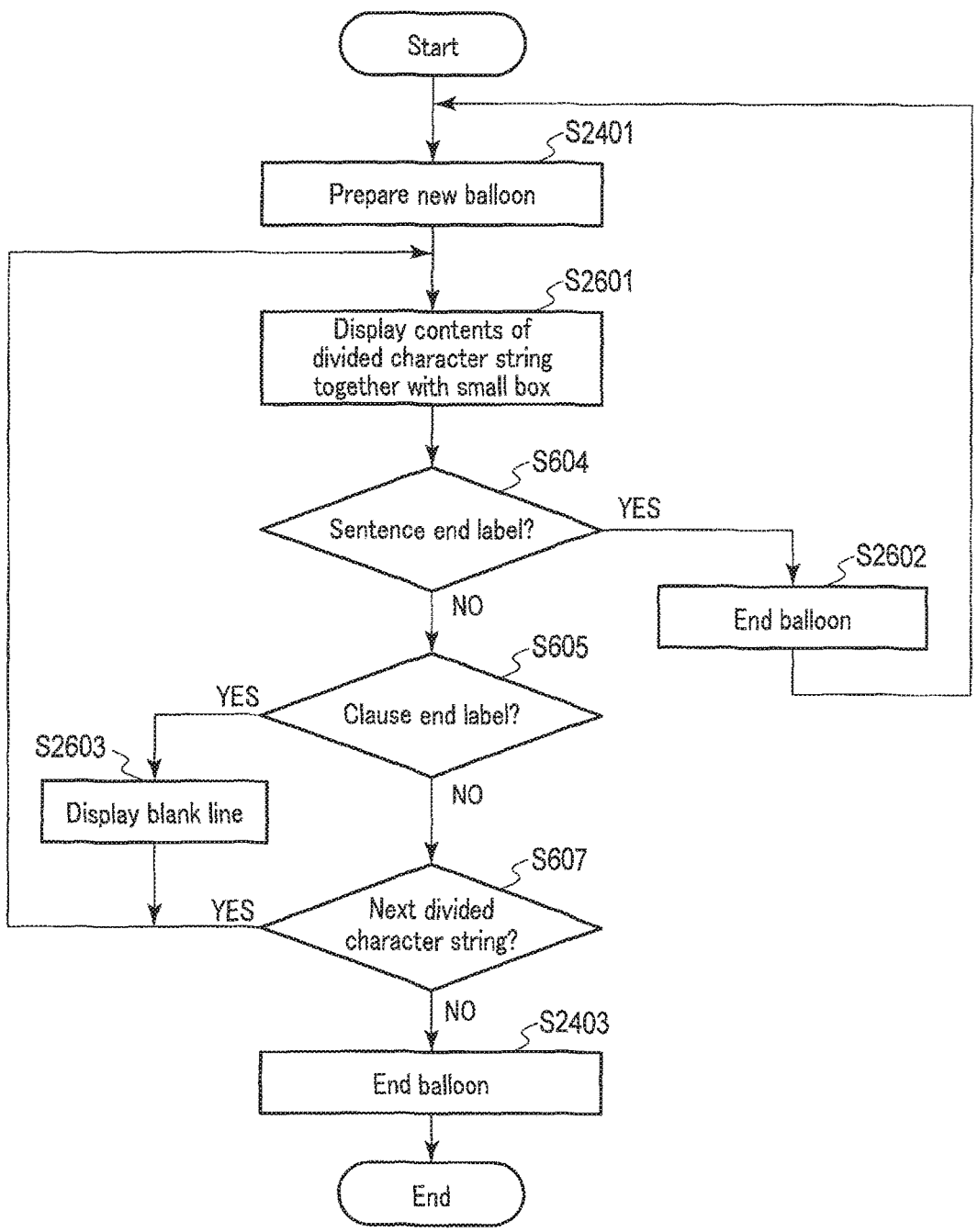
FIG. 26 is a flowchart showing the operation of the display controller according to the first modification of the fifth embodiment.

The operation of the display controller 104 according to the first modification of the fifth embodiment will be described with reference to the flowchart of FIG. 26.

The processes of steps S604, S605, S607, S2401, and S2403 are the same as in the above-described embodiment, and a description thereof will be omitted.

In step S2601, the display controller 104 displays the contents of a divided character string in a box that is smaller than a balloon and fits in the balloon.

In step S2602, the display controller 104 ends the current balloon and returns to step S2401 to repeat the same processing as described above.

In step S2603, the display controller 104 displays a blank line and returns to step S2601 to repeat the same processing as described above.

Figure 27:
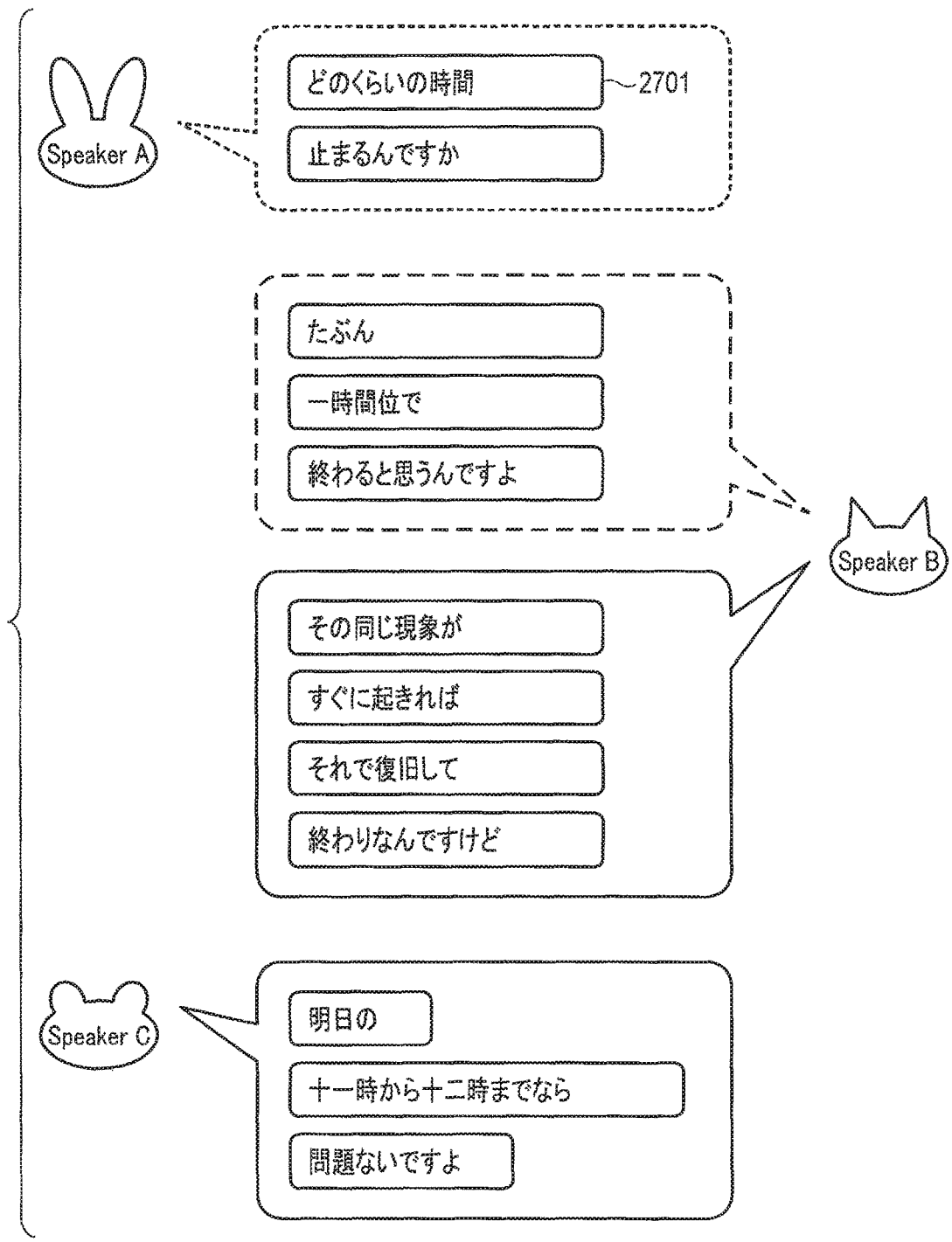
FIG. 27 is a view showing a detailed example of display control by the display controller according to the first modification of the fifth embodiment.

FIG. 27 shows a detailed example of display control by the display controller 104 according to the first modification of the fifth embodiment.

As shown in FIG. 27, since a divided character string is displayed in a box 2701 in a balloon, the visibility of the subtitle can be improved.

Second Modification of Fifth Embodiment

Figure 28:
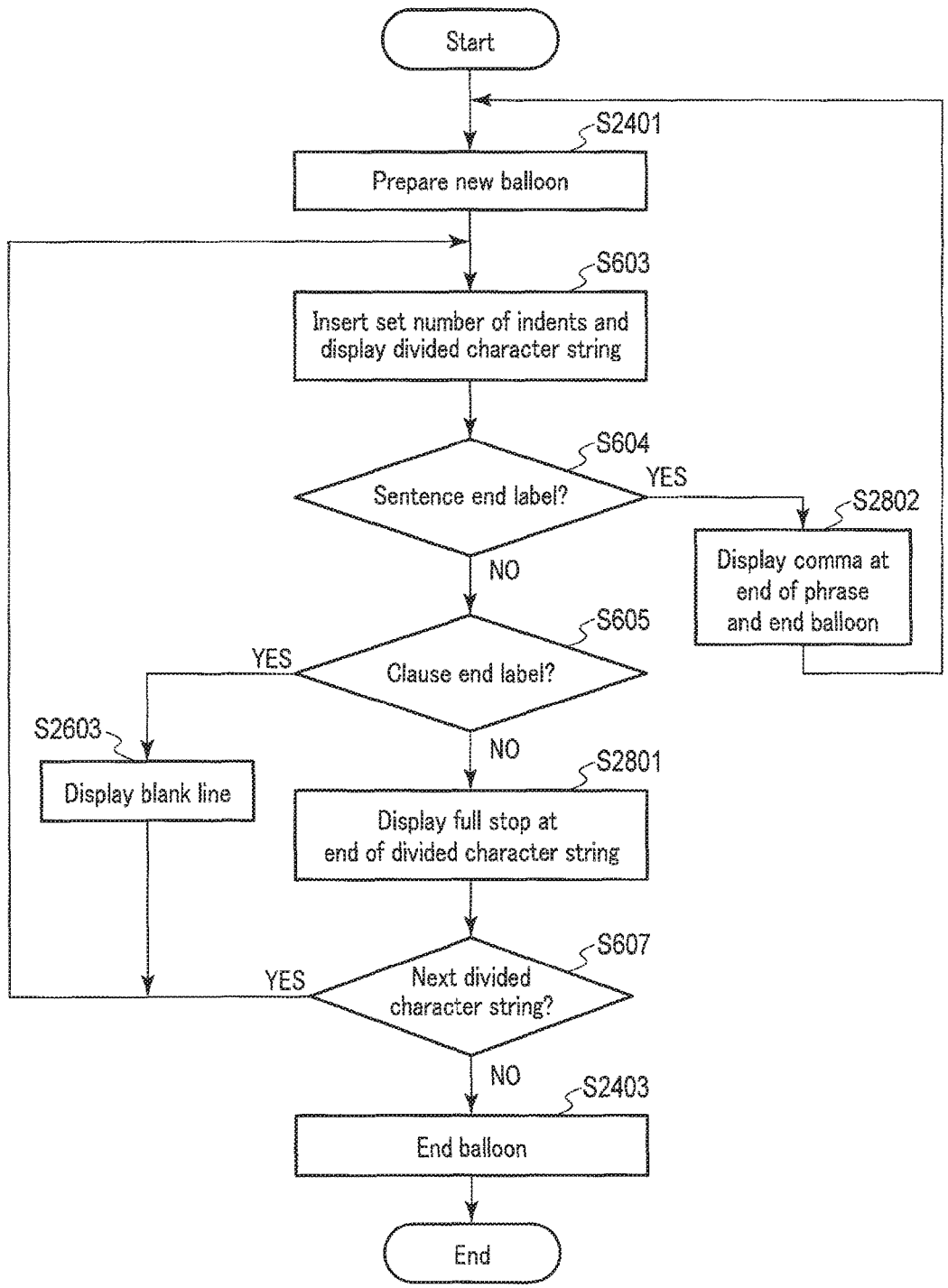
FIG. 28 is a flowchart showing the operation of the display controller according to the second modification of the fifth embodiment.

The second modification of the fifth embodiment will be described with reference to the flowchart of FIG. 28.

The processes of steps S603 to S605, S607, S2401, S2403, and S2603 are the same as in the above-described embodiment, and a description thereof will be omitted.

In step S2801, if a clause end label or a sentence end label is not added, the display controller 104 displays a full stop at the end of the divided character string.

In step S2802, the display controller 104 displays a comma at the end of the divided character string, and ends the current balloon. After that, the process returns to step S2401 to repeat the same processing as described above.

Figure 29:
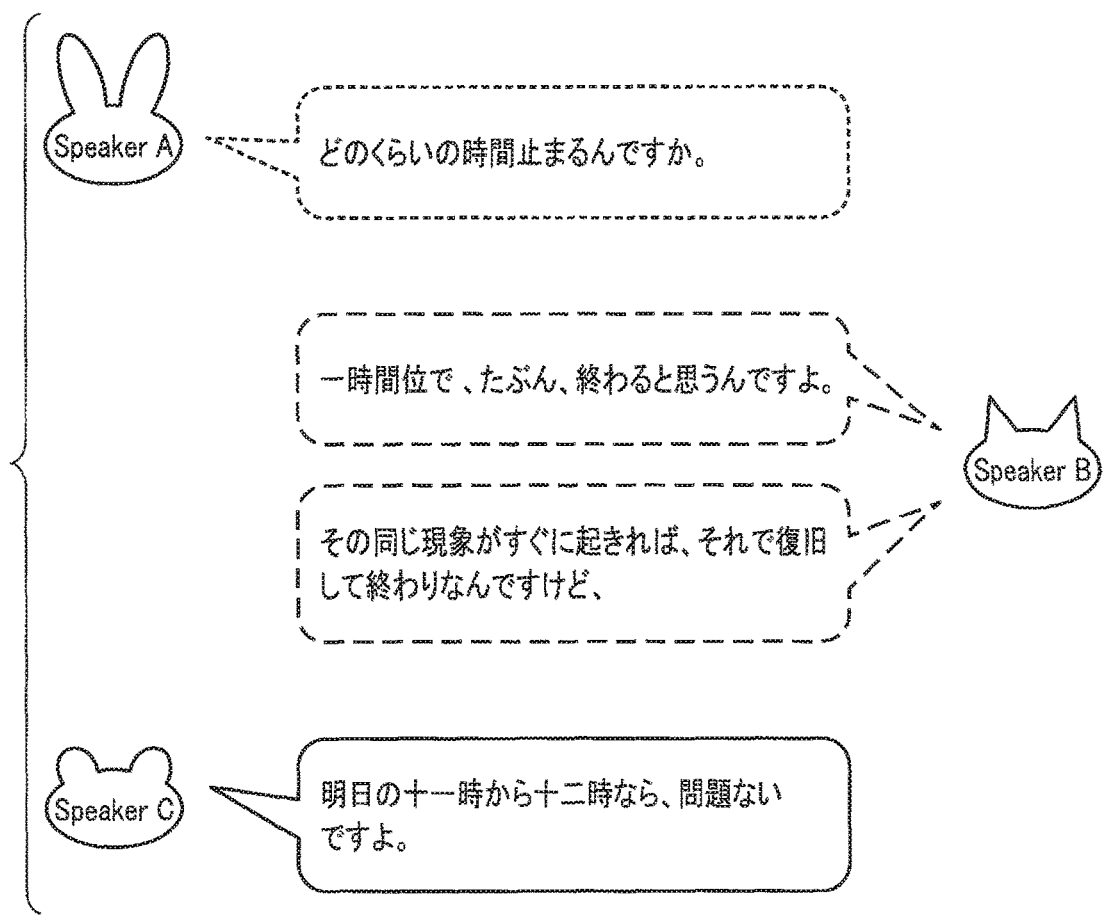
FIG. 29 is a view showing a detailed example of display control by the display controller according to the second modification of the fifth embodiment.

FIG. 29 shows an example of display according to the second modification of the fifth embodiment.

In FIG. 29 as well, since each divided character string is displayed with a full stop or a comma in a balloon, the visibility of the subtitle can be improved, as in FIG. 27.

FIG. 30 shows another example of display control in a case in which an expression is converted by an expression convertor 901.

FIG. 30 shows a case in which a divided character string 2309 shown in FIG. 23 is converted by the expression convertor 901, and the added label is changed from a clause end label to a sentence end label. The display controller 104 changes the color of the character string of a divided character string 3001.

Figure 31:
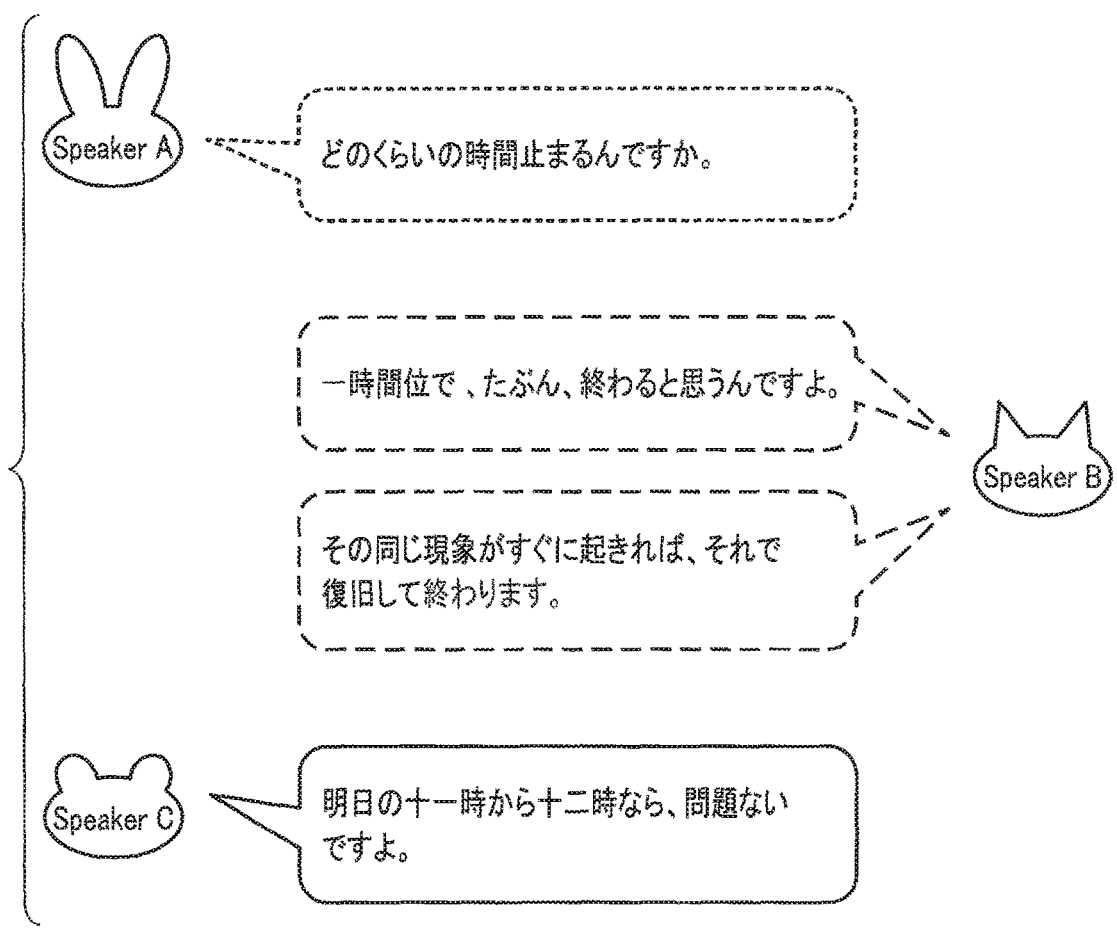
FIG. 31 is a view showing a detailed example of display control concerning the processing shown in FIG. 30.

FIG. 31 shows another example of display in a case in which an expression is converted by the expression convertor 901. When the color of the converted portion is changed, the user can easily grasp the changed portion. Note that the change is not limited to changing the color, and underlining or italicizing may be performed.

According to the above-described fifth embodiment, for inputs from a plurality of users, the utterances are separated for each speaker using balloons. In addition, display control as in the above-described embodiment is performed for the divided character string in each balloon, thereby facilitating distinction between the speakers and assisting the user in understanding the contents.

An instruction shown in the processing procedures of the above-described embodiments can be executed based on a program that is software. When a general-purpose computer system stores the program in advance and loads it, the same effects as those of the above-described display assist apparatuses can be obtained. Each instruction described in the above embodiments is recorded in a magnetic disk (for example, flexible disk or hard disk), an optical disk (for example, CD-ROM, CD-R, CD-RW, DVD-ROM, DVD±R, DVD±RW, or Blu-ray® Disc), a semiconductor memory, or a similar recording medium as a program executable by a computer. Any storage format is employable as long as the recording medium is readable by a computer or an embedded system. When the computer loads the program from the recording medium, and causes the CPU to execute the instruction described in the program based on the program, the same operation as the display assist apparatuses according to the above-described embodiments can be implemented. When the computer acquires or loads the program, it may be acquired or loaded via a network, as a matter of course.

An OS (Operating System) operating on the computer or MW (middleware) such as database management software or a network may execute part of each processing for implementing the embodiments based on the instruction of the program installed from the recording medium to the computer or embedded system.

The recording medium according to the embodiments is not limited to a medium independent of the computer or embedded system, and also includes a recording medium that stores or temporarily stores the program transmitted by a LAN or the Internet and downloaded.

The number of recording media is not limited to one. The recording medium according to the embodiments also incorporates a case in which the processing of the embodiments is executed from a plurality of media, and the media can have any arrangement.

Note that the computer or embedded system according to the embodiments is configured to execute each processing of the embodiments based on the program stored in the recording medium, and can be either a single device formed from a personal computer or microcomputer or a system including a plurality of devices connected via a network.

The computer according to the embodiments is not limited to a personal computer, and also includes an arithmetic processing device or microcomputer included in an information processing apparatus. Computer is a general term for apparatuses and devices capable of implementing the functions of the embodiments by the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display assist apparatus comprising:
an acquisition unit configured to acquire a character string which is included in a spoken language;
a first processor configured to divide the character string into first segments each of which is a segment representing a semantic cluster and generate a plurality of divided character strings;
a first adder configured to add a plurality of role labels to first divided character strings of the plurality of divided character strings, the role labels representing roles of the first divided character strings, the roles including pauses used as one of the first segments;
a second processor configured to detect, for the character string, second segments each of which is a segment larger than the each of the first segments;
detect the role labels and an arrangement of the pauses, and determine one of a clause end or a sentence end;
a second adder configured to add a plurality of ending labels to second divided character strings of the plurality of divided character strings at ends of the second segments; and
a display controller configured to perform display control to make a distinction between the first segments and the second segments based on ending labels and an order of the role labels when displaying the plurality of divided character strings.

2. The apparatus according to claim 1, further comprising a convertor configured to convert an expression of the divided character string into another expression based on a conversion rule,
wherein the display controller performs the display control based on the converted divided character string.

3. The apparatus according to claim 1, wherein when displaying the plurality of divided character strings, the display controller performs processing of displaying a second divided character string following a first divided character string with an indent, and if the second divided character string is located at an end of the second segment, the display controller performs processing of displaying a blank line after the second divided character string is displayed.

4. The apparatus according to claim 1, further comprising a machine translator configured to machine-translate the plurality of divided character strings from a first language to a second language,
wherein the display controller performs the display control for the machine-translated divided character strings.

5. The apparatus according to claim 4, further comprising a determiner configured to determine a display order of the plurality of divided character strings based on a word order determination rule of the second language, wherein the display controller performs the display control for the plurality of divided character strings for which the display order is determined.

6. The apparatus according to claim 1, wherein the character string is a character string of a speech recognition result.

7. The apparatus according to claim 1, wherein the first segment is a phrase, and the second segment is one of a clause and a sentence.

8. The apparatus according to claim 1, wherein the first segment is a simple sentence, and the second segment is a compound sentence.

9. The apparatus according to claim 1, wherein the acquisition unit further acquires speaker information of each speaker, and
the display controller performs the display control to make a distinction between the speakers.

10. A display assist method comprising:
acquiring a character string which is included in a spoken language;
dividing the character string into first segments each of which is a segment representing a semantic cluster;
generating a plurality of divided character strings;
adding a plurality of role labels to first divided character strings of the plurality of divided character strings, the role labels representing roles of the first divided character strings, the roles including pauses used as one of the first segments;
detecting, for the character string, second segments each of which is a segment larger than the each of the first segments;
detecting the role labels and an arrangement of the pauses;
determining one of a clause end or a sentence end;
adding a plurality of ending labels to second divided character strings of the plurality of divided character strings at ends of the second segments; and
performing display control to make a distinction between the first segments and the second segments based on ending labels and an order of the role labels when displaying the plurality of divided character strings.

11. A non-transitory computer readable medium storing a computer program which is executed by a computer to provide the steps of:
acquiring a character string which is included in a spoken language;
dividing the character string into first segments each of which is a segment representing a semantic cluster;
generating a plurality of divided character strings;
adding a plurality of role labels to first divided character strings of the plurality of divided character strings, the role labels representing roles of the first divided character strings, the roles including pauses used as one of the first segments;
detecting, for the character string, second segments each of which is a segment larger than the each of the first segments;
detecting the role labels and an arrangement of the pauses;
determining one of a clause end or a sentence end;
adding a plurality of ending labels to second divided character strings of the plurality of divided character strings at ends of the second segments; and
performing display control to make a distinction between the first segments and the second segments based on ending labels and an order of the role labels when displaying the plurality of divided character strings.

* * * * *